(12) United States Patent
Jung et al.

(10) Patent No.: US 10,652,397 B2
(45) Date of Patent: May 12, 2020

(54) TERMINAL DEVICE AND METHOD FOR PERFORMING CALL FUNCTION

(71) Applicant: SAMSUNG ELECTRONICS CO., LTD., Suwon-si (KR)

(72) Inventors: Kyung-hun Jung, Seoul (KR); Ho-sang Sung, Yongin-si (KR); Eun-mi Oh, Seoul (KR); Jong-hoon Jeong, Hwaseong-si (KR); Ki-hyun Choo, Seoul (KR); Byeong-hoon Kwak, Uiwang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/339,982

(22) PCT Filed: Oct. 7, 2016

(86) PCT No.: PCT/KR2016/011222
§ 371 (c)(1),
(2) Date: Apr. 5, 2019

(87) PCT Pub. No.: WO2018/066731
PCT Pub. Date: Apr. 12, 2018

(65) Prior Publication Data
US 2019/0289132 A1    Sep. 19, 2019

(51) Int. Cl.
*H04M 7/00*    (2006.01)
*G06K 9/00*    (2006.01)
(Continued)

(52) U.S. Cl.
CPC ...... *H04M 7/0072* (2013.01); *G06K 9/00228* (2013.01); *G10L 19/22* (2013.01);
(Continued)

(58) Field of Classification Search
USPC .......................................................... 704/203
See application file for complete search history.

(56) References Cited

U.S. PATENT DOCUMENTS 9,036,526 B2    5/2015    Chizgi et al.
9,053,702 B2    6/2015    Rajendran et al.
(Continued)

FOREIGN PATENT DOCUMENTS

KR    10-2005-0093539 A    9/2005
KR    10-2008-0047208 A    5/2008
(Continued)

OTHER PUBLICATIONS

International Search Report (PCT/ISA/210) and Written Opinion (PCT/ISA/237) dated Jun. 30, 2017 issued by the International Searching Authority in International Application No. PCT/KR2016/011222.

*Primary Examiner* — Amal S Zenati
(74) *Attorney, Agent, or Firm* — Sughrue Mion, PLLC

(57) ABSTRACT

Provided are a terminal device and method of performing a call function transmitting ambient audio with high sensitivity.

A terminal device performing a call function with at least one external device via a network may include a receiver configured to receive at least one of an audio transmission signal and a video transmission signal to be transmitted to the external device; a processor configured to analyze at least one of the audio transmission signal and the video transmission signal, select one of a speech mode and an audio mode, based on a result of the analysis, and compress the audio transmission signal, based on the selected mode; a communicator configured to transmit the compressed audio transmission signal to the external device, and receive
(Continued)

an audio reception signal from the external device; and an output unit configured to output the audio reception signal.

16 Claims, 20 Drawing Sheets

(51) Int. Cl.
    *G10L 19/22*     (2013.01)
    *G10L 25/78*     (2013.01)
    *H04N 7/14*     (2006.01)
    *H04M 1/60*     (2006.01)
    *H04M 1/725*     (2006.01)

(52) U.S. Cl.
    CPC ............... *G10L 25/78* (2013.01); *H04M 1/60* (2013.01); *H04M 1/725* (2013.01); *H04N 7/147* (2013.01)

(56) References Cited

U.S. PATENT DOCUMENTS

| | | | |
|---|---|---|---|
| 9,113,240 B2 | 8/2015 | Ramakrishnan et al. | |
| 9,232,071 B2 | 1/2016 | Visser et al. | |
| 9,263,054 B2 | 2/2016 | Subasingha et al. | |
| 9,264,374 B2 | 2/2016 | Kullangal et al. | |
| 9,462,230 B1* | 10/2016 | Agrawal | H04N 7/155 |
| 2013/0185084 A1* | 7/2013 | Rajendran | G10L 19/04 704/500 |
| 2014/0376414 A1 | 12/2014 | Edge et al. | |
| 2015/0063227 A1 | 3/2015 | Chaponniere et al. | |
| 2015/0065143 A1 | 3/2015 | Hsu et al. | |
| 2015/0100318 A1 | 4/2015 | Rajagopalan et al. | |
| 2015/0296359 A1 | 10/2015 | Edge | |
| 2016/0014578 A1 | 1/2016 | Kadiyala et al. | |
| 2016/0014579 A1 | 1/2016 | Kasilya Sudarsan et al. | |
| 2016/0014586 A1 | 1/2016 | Stupar et al. | |
| 2016/0021520 A1 | 1/2016 | Gudu Gantla et al. | |
| 2016/0021523 A1 | 1/2016 | Mahendran | |
| 2016/0029197 A1 | 1/2016 | Gellens | |
| 2016/0036564 A1 | 2/2016 | Krishnan et al. | |
| 2016/0055859 A1* | 2/2016 | Finlow-Bates | G10L 21/0202 704/225 |
| 2016/0129960 A1 | 5/2016 | Akins et al. | |
| 2017/0093944 A1* | 3/2017 | Hockett | H04L 65/601 |

FOREIGN PATENT DOCUMENTS

| | | |
|---|---|---|
| KR | 10-0868638 B1 | 11/2008 |
| KR | 10-2009-0059437 A | 6/2009 |
| KR | 10-2014-0070134 A | 6/2014 |
| KR | 10-2014-0131059 A | 11/2014 |
| KR | 10-2016-0040357 A | 4/2016 |

* cited by examiner

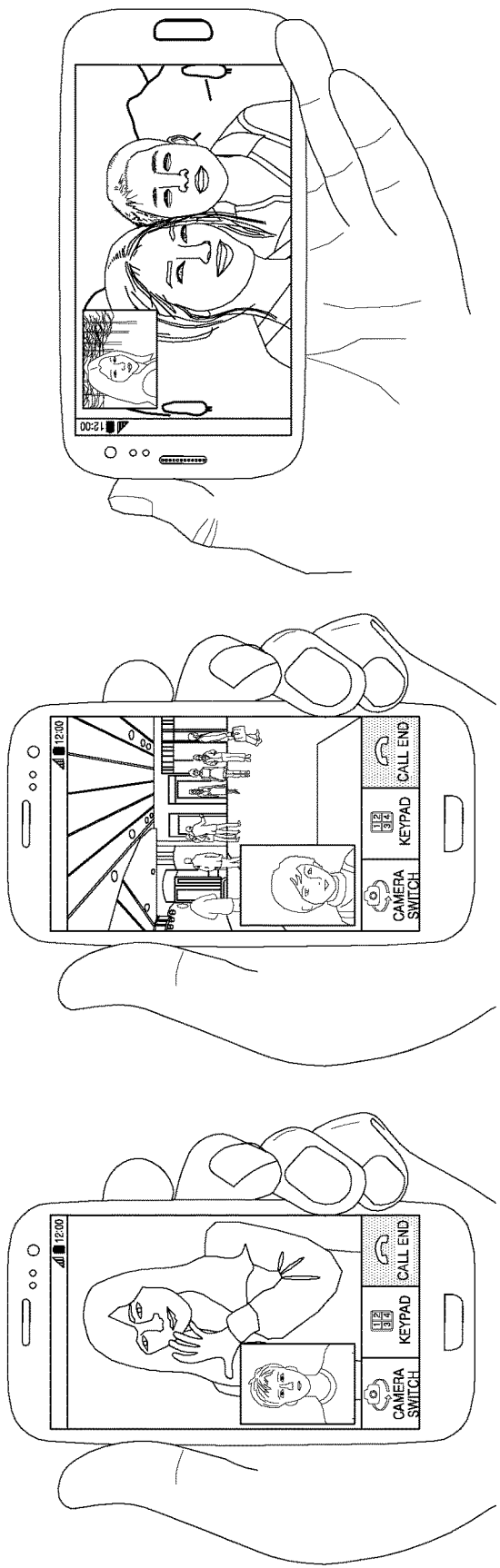

FIG. 3

FIG. 9
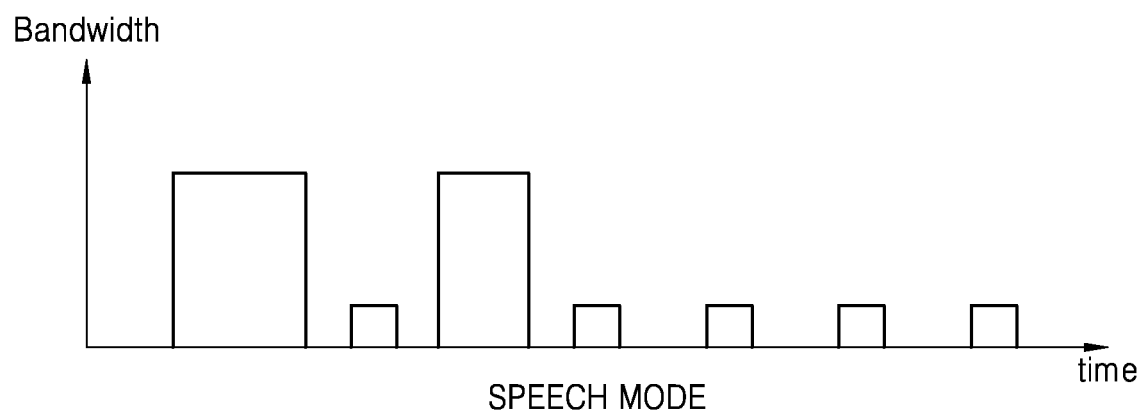
SPEECH MODE
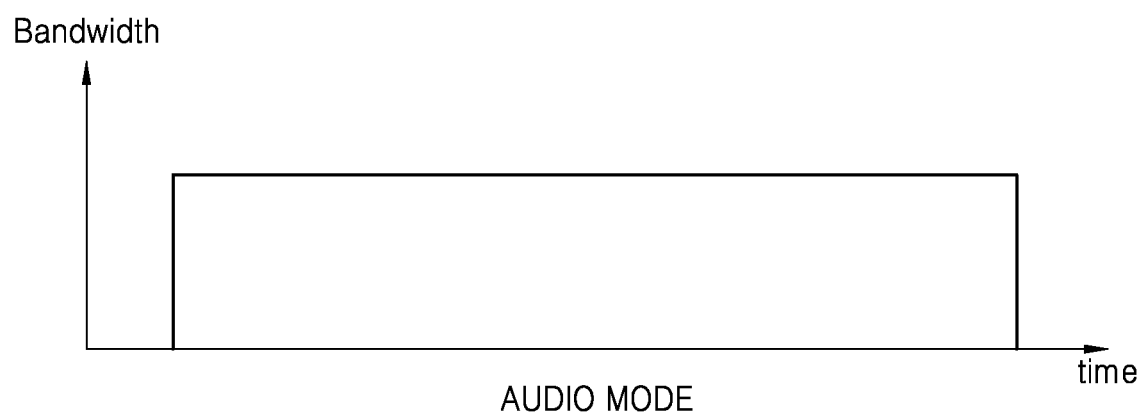
AUDIO MODE

FIG. 10
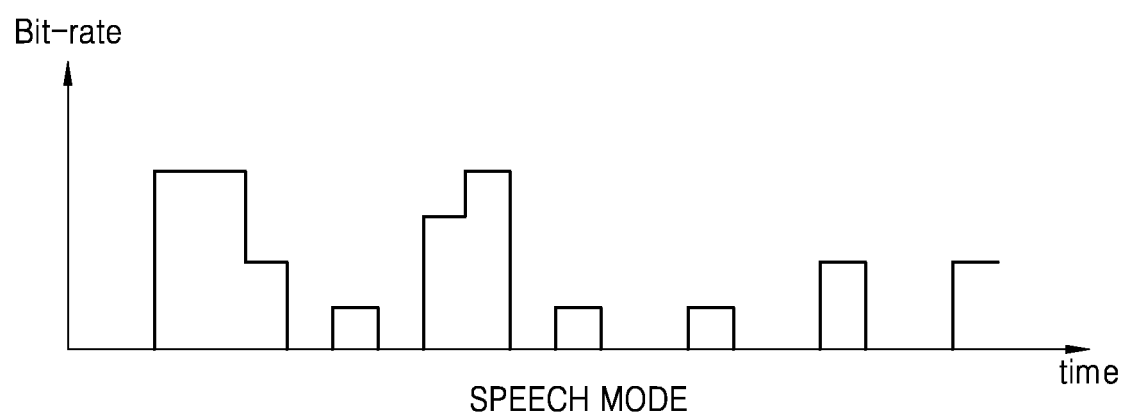
SPEECH MODE
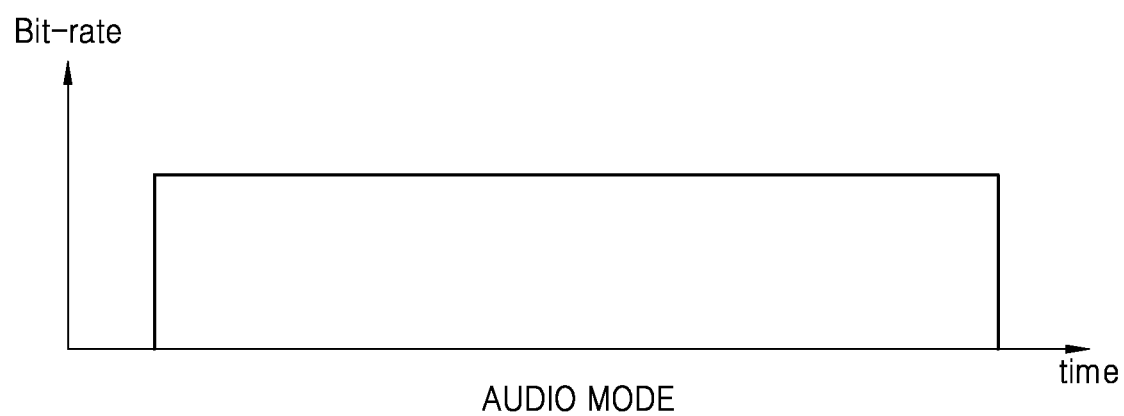
AUDIO MODE

FIG. 11

```
m=audio 49152 RTP/AVP 97
b=AS:42
b=RS:0
b=RR:2000
a=rtpmap:97 EVS/16000/1
a=fmtp:97 br=13.2-24.4; bw=nb-swb; max-
red=220       1101        1103
```

FIG. 12

| bitrate | 7.2 | 8 | 9.6 | 13.2 | 16.4 | 24.4 | 32 | 48 | 64 |
|---|---|---|---|---|---|---|---|---|---|
| NB | | | | | | | | | |
| speech | ACELP | ACELP | ACELP | ACELP | ACELP | ACELP | | | |
| audio | HQ MDCT | HQ MDCT | TCX | TCX/HQ MDCT | TCX/HQ MDCT | TCX | | | |
| noise | GSC | GSC | TCX | GSC | TCX | TCX | | | |
| WB | | | | | | | | | |
| speech | ACELP | ACELP | ACELP | ACELP | ACELP | ACELP | ACELP | TCX | ACELP |
| audio | GSC | GSC | TCX | GSC/TCX/HQ MDCT | TCX/HQ MDCT | TCX | HQ MDCT | TCX | HQ MDCT |
| noise | GSC | GSC | TCX | GSC | TCX | TCX | ACELP | TCX | ACELP |
| SWB | | | | | | | | | |
| speech | | | | ACELP | ACELP | ACELP | ACELP | TCX | ACELP |
| audio | | | | GSC/TCX/HQ MDCT | TCX/HQ MDCT | TCX/HQ MDCT | TCX/HQ MDCT | TCX | HQ MDCT |
| noise | | | | GSC | TCX | TCX | ACELP | TCX | ACELP |
| FB | | | | | | | | | |
| speech | | | | | ACELP | ACELP | ACELP | TCX | ACELP |
| audio | | | | | TCX | TCX/HQ MDCT | TCX/HQ MDCT | TCX | HQ MDCT |
| noise | | | | | TCX | TCX | ACELP | TCX | ACELP |

TERMINAL DEVICE AND METHOD FOR PERFORMING CALL FUNCTION

TECHNICAL FIELD

The present disclosure is related to a terminal device and method of performing a call function, and more particularly, to a terminal device and method of performing a call function by compressing and transmitting an audio signal by using an audio mode capable of transmitting ambient audio with high sensitivity.

BACKGROUND ART

High-speed transmission of a large amount of data has become possible due to developments in wireless communication technology, such that terminal devices have been developed to perform not only a voice call function but also perform a video call function. A video call function indicates a function of transceiving an audio signal and a video signal among a plurality of terminal devices. When a video call starts, a terminal device may activate a camera, compress a video signal received from the outside, and transmit a compressed video signal to an opposite terminal device.

In a general case in which a terminal device performs a voice call function, a user of the terminal device transceives speech while capturing and transmitting an image of his/her own face. On the other hand, when the user of the terminal device captures and transmits an image of a surrounding environment and ambient audio, a user of an opposite terminal device experiences high-level noise compared to a general voice call. Because the terminal device uses a speech compression technology developed on the assumption that voice is input, when the terminal device attempts to compress and transmit non-voice audio, call quality may significantly deteriorate.

When the terminal device transmits voice signals of two or more users to an opposite terminal device, a user of the opposite terminal device experiences high-level noise. Because the terminal device uses a speech compression technology developed on the assumption that speech of one person located near a microphone of the terminal device is input, when two or more users simultaneously perform a video call, call quality may significantly deteriorate.

DESCRIPTION OF EMBODIMENTS

Technical Problem

Provided is a terminal device providing high call quality even when an audio signal including audio other than voice of one person is transmitted.

Solution to Problem

According to an embodiment, a terminal device switching to an audio mode, based on a result of analyzing call content, and operating in the audio mode, and a method thereof are provided.

Advantageous Effects of Disclosure

According to a terminal device and method according to an embodiment, ambient audio may be transmitted with high sensitivity.

BRIEF DESCRIPTION OF DRAWINGS

FIGS. 1A, 1B and 1C are diagrams for describing a video call.

FIG. 3 is a diagram for describing a discontinuous transmission (DTX) technique.

FIGS. 9 and 10 are diagrams for describing a speech mode and an audio mode.

FIG. 11 illustrates an example of a call condition of a terminal device supporting an EVS codec.

FIGS. 12, 13, and 14 are diagrams for describing a method of compressing an audio signal according to an audio mode, regardless of the audio signal input to a terminal device.

BEST MODE

Figure 2A:
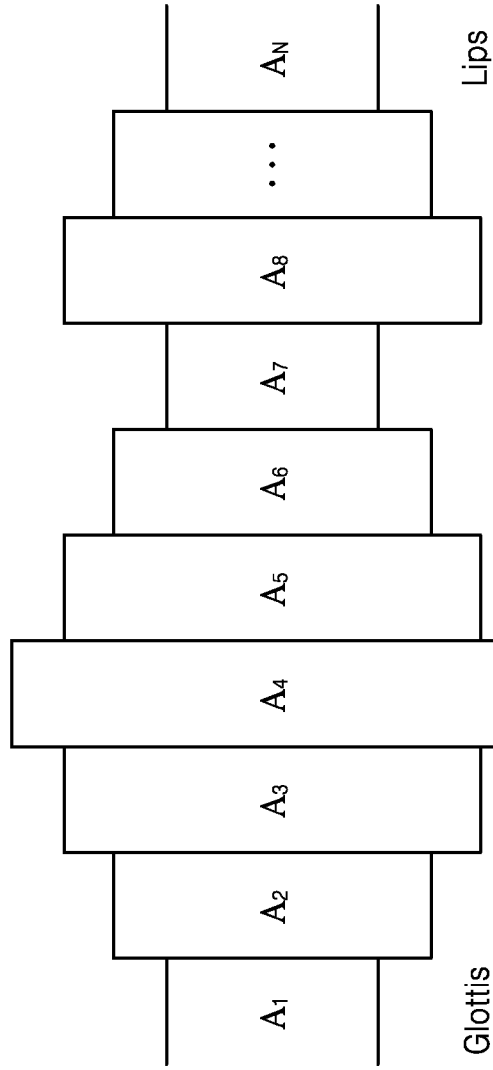
FIGS. 2A and 2B are diagrams for describing linear predictive coding (LPC).

According to an embodiment, a terminal device performing a call function with at least one external device via a network may include a receiver configured to receive at least one of an audio transmission signal and a video transmission signal to be transmitted to the external device; a processor configured to analyze at least one of the audio transmission signal and the video transmission signal, select one of a speech mode and an audio mode, based on a result of the analysis, and compress the audio transmission signal, based on the selected mode; a communicator configured to transmit the compressed audio transmission signal to the external device, and receive an audio reception signal from the external device; and an output unit configured to output the audio reception signal.

MODE OF DISCLOSURE

According to an embodiment, a terminal device performing a call function with at least one external device via a network may include a receiver configured to receive at least one of an audio transmission signal and a video transmission signal to be transmitted to the external device; a processor configured to analyze at least one of the audio transmission signal and the video transmission signal, select one of a speech mode and an audio mode, based on a result of the analysis, and compress the audio transmission signal, based on the selected mode; a communicator configured to transmit the compressed audio transmission signal to the external device, and receive an audio reception signal from the external device; and an output unit configured to output the audio reception signal.

The speech mode may be a mode of using a compression scheme designed to compress a speech signal, and the audio mode may be a mode of using a compression scheme designed to compress a non-speech audio signal.

The speech mode may be a mode of using a compression scheme of changing at least one of a bit-rate and a bandwidth, according to the audio transmission signal, and the audio mode may be a mode of using a compression scheme of using at least one of a maximum bit-rate and a maximum bandwidth that are allowed in a call condition received via the network, regardless of the audio transmission signal.

The terminal device may use an Enhanced Voice Services (EVS) codec to compress an audio signal, the speech mode may be a mode of compressing the audio transmission signal by using an algebraic code-excited linear prediction (ACELP) scheme, and the audio mode may be a mode of compressing the audio transmission signal by using a modified discrete cosine transform (MDCT) scheme.

The speech mode may be a mode of performing at least one of discontinuous transmission (DTX), linear predictive coding (LPC), and noise suppression (NS) in compressing the audio transmission signal, and the audio mode may be a mode of discontinuing the performing of at least one of DTX, LPC, and NS in compressing the audio transmission signal, and amplifying an output of a microphone receiving the audio transmission signal.

The processor may be further configured to select one of the speech mode and the audio mode, based on a result of analyzing the video transmission signal.

The processor may be further configured to detect a face of a human from each of a plurality of frames included in the video transmission signal, and select one of the speech mode and the audio mode, based on at least one of the number of detected faces and an area of the detected face in an image.

The processor may be is further configured to select the speech mode, when the number of detected faces is 1 within a particular time and the area of the detected face in the image is greater than a threshold area, and select the audio mode, when the number of detected faces is equal to or greater than 2 within the particular time or the area of the detected face is equal to or less than the threshold area.

The processor may be further configured to detect a human speech from each of a plurality of frames included in the audio transmission signal, calculate a proportion based on the number of frames from which the human speech is not detected within a particular time, and select one of the speech mode and the audio mode, based on the calculated proportion.

The processor may be further configured to select the speech mode, when the proportion of frames from which a human speech is not detected within the particular time among the plurality of frames is equal to or less than a threshold proportion, and select the audio mode, when the proportion of frames from which a human speech is not detected within the particular time among the plurality of frames is greater than the threshold proportion.

The processor may be further configured to select the audio mode, and compress an audio transmission signal including an audio signal generated by a device located near the terminal device, and the compressed audio transmission signal transmitted to the external device may be used in tracing a location of the terminal device.

According to an embodiment, a method of performing, by a terminal device, a call function with at least one external device via a network, includes receiving at least one of an audio transmission signal and a video transmission signal to be transmitted to the external device; analyzing at least one of the audio transmission signal and the video transmission signal, and selecting one of a speech mode and an audio mode, based on a result of the analysis; compressing the audio transmission signal, based on the selected mode; and transmitting the compressed audio transmission signal to the external device.

The speech mode may be a mode of using a compression scheme designed to compress a speech signal, and the audio mode may be a mode of using a compression scheme designed to compress a non-speech audio signal.

The speech mode may be a mode of using a compression scheme of changing at least one of a bit-rate and a bandwidth, according to the audio transmission signal, and the audio mode may be a mode of using a compression scheme of using at least one of a maximum bit-rate and a maximum bandwidth that are allowed in a call condition received via the network, regardless of the audio transmission signal.

The terminal device may use an Enhanced Speech Services (EVS) codec to compress an audio signal, the speech mode may be a mode of compressing the audio transmission signal by using an algebraic code-excited linear prediction (ACELP) scheme, and the audio mode may be a mode of compressing the audio transmission signal by using a modified discrete cosine transform (MDCT) scheme.

The speech mode may be a mode of performing at least one of discontinuous transmission (DTX), linear predictive coding (LPC), and noise suppression (NS) in compressing the audio transmission signal, and the audio mode may be a mode of discontinuing the performing of at least one of DTX, LPC, and NS in compressing the audio transmission signal, and amplifying an output of a microphone receiving the audio transmission signal.

The selecting may include selecting one of the speech mode and the audio mode, based on a result of analyzing the video transmission signal.

The selecting may include detecting a face of a human from each of a plurality of frames included in the video transmission signal; selecting the speech mode, when the number of detected faces is 1 and an area of the detected face in an image within a particular time is greater than a threshold area; and selecting the audio mode, when the number of detected faces is equal to or greater than 2 within the particular time or the area of the detected face in the image is equal to or less than the threshold area.

The selecting may include detecting a human speech from each of a plurality of frames included in the audio transmission signal; and selecting one of the speech mode and the audio mode, based on a proportion of frames from which a human speech is not detected within a particular time among the plurality of frames.

The selecting of one of the speech mode and the audio mode, based on the proportion of the frames from which a human speech is not detected may include selecting the speech mode, when the proportion of frames from which a human speech is not detected within the particular time among the plurality of frames is equal to or less than a threshold proportion; and selecting the audio mode, when the proportion of frames from which the human speech is not detected within the particular time among the plurality of frames is greater than the threshold proportion.

The compressing may include compressing, based on the audio mode, an audio transmission signal including an audio signal generated by a device located near the terminal device, and the compressed audio transmission signal transmitted to the external device may be used in tracing a location of the terminal device.

According to an embodiment, a computer-readable recording medium may have recorded thereon at least one program including instructions, when executed on a computing device, cause a terminal device to perform a method of performing a call function with at least one external device via a network, the method including receiving at least one of an audio transmission signal and a video transmission signal to be transmitted to the external device; analyzing at least one of the audio transmission signal and the video transmission signal, and selecting one of a speech mode and an audio mode, based on a result of the analysis; compressing the audio transmission signal, based on the selected mode; and transmitting the compressed audio transmission signal to the external device.

The present disclosure will now be described more fully with reference to the accompanying drawings for one of ordinary skill in the art to be able to perform the present disclosure without any difficulty. The present disclosure may, however, be embodied in many different forms and should not be construed as being limited to the embodiments set forth herein. In addition, portions irrelevant to the description of the present disclosure will be omitted in the drawings for a clear description of the present disclosure, and like reference numerals will denote like elements throughout the specification.

Throughout the specification, it will also be understood that when an element is referred to as being "connected to" or "coupled with" another element, it can be directly connected to or coupled with the other element, or it can be electrically connected to or coupled with the other element by having an intervening element interposed therebetween. Also, when a part "includes" or "comprises" an element, unless there is a particular description contrary thereto, the part can further include other elements, not excluding the other elements.

Throughout the specification, the expression "in some embodiments" or "in an embodiment" is described, but the expression does not necessarily indicate the same embodiment.

Some embodiments may be described in terms of functional block components and various processing steps. Some or all of functional blocks may be realized by any number of hardware and/or software components configured to perform the specified functions. For example, the functional blocks of the present disclosure may be implemented by one or more processor or microprocessors, or may be implemented by circuit components for predetermined functions. In addition, for example, the functional blocks of the present disclosure may be implemented with any programming or various scripting languages. The functional blocks may be implemented in algorithms that are executed on one or more processors. Furthermore, the disclosure could employ any number of techniques according to the related art for electronics configuration, signal processing and/or data processing, and the like. The terms "module", "configuration", or the like may be broadly used and are not limited to mechanical or physical embodiments.

Furthermore, connecting lines or connectors between elements shown in drawings are intended to represent exemplary functional connection and/or physical or logical connection between the elements. It should be noted that many alternative or additional functional connections, physical connections or logical connections may be present in a practical device.

The present disclosure will now be described more fully with reference to the accompanying drawings.

Due to developments in wireless communication technology, terminal devices are able to transmit and receive not only speech but also video, and thus, are able to perform a video call function. As illustrated in FIG. 1A, a user may talk while viewing the face of another person on the screen of a terminal device.

Due to development in a network, it is possible to transmit a high-definition video compressed at a high bit-rate to an opposite terminal device. As illustrated in FIG. 1B, a terminal device may transmit not only a face of a user but also transmit a background image. FIG. 1B illustrates a situation in which not a user but a surrounding environment of a terminal device is captured and transmitted. When definition of a video exchangeable by the terminal device is increased, there may be many cases of capturing and transmitting a surrounding environment or a situation other than a face of a person. In this case, a user of an opposite terminal device experiences high-level noise, compared to a case of receiving a face image and voice of one person. Because a general terminal device uses a speech compression technology developed provided that speech is input, when the terminal device attempts to transmit audio, not a speech, a call quality may significantly deteriorate.

Even when an input signal is a speech, a call quality a receiver experiences may deteriorate, similar to a case illustrated in FIG. 1A. FIG. 1C illustrates a case in which two people simultaneously perform a video call to a user of an opposite terminal device. For example, a terminal device shown in FIG. 1C may be a terminal device providing a display larger than that of the terminal device shown in FIG. 1A. When a terminal device simultaneously transmits speech signals of at least two users to an opposite terminal device, a user of the opposite terminal device experiences high-level noise. Because a terminal device uses a speech compression technology developed provided that speech of one person located near a microphone of the terminal device is input, when two or more users simultaneously do a video call, a call quality may significantly deteriorate.

Figure 2B:
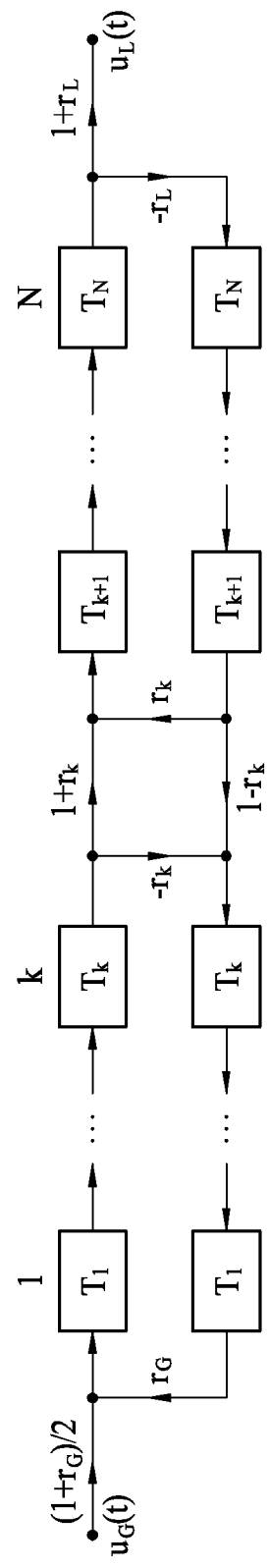

The reason why a call quality deteriorates is described below. Existing speech compression codecs such as an Enhanced Variable Rate Codec (EVRC), an Adaptive Multi-Rate (AMR) audio codec, an Adaptive Multi-Rate Wideband (AMR-WB) codec, or the like compress a speech signal at a lowest bit-rate by using a linear predictive coding (LPC) technique. As illustrated in FIG. 2A, the LPC technique may simplify and visualize human vocal cords as a plurality of sequential cylinders having different diameters. Then, as illustrated in FIG. 2B, the LPC technique may compress a speech signal at a lowest bit-rate by visualizing the plurality of cylinders as an electrical circuit. Therefore, in a case where the LPC technique that is a technique of compressing speech assuming that the speech is output from human vocal cords is used, when a signal where general ambient noise other than speech or a plurality of human speeches are overlapped is compressed, a quality of a compressed audio signal may deteriorate.

In a mobile communication network such as Global System for Mobile Communications (GSM), wideband code-division multiple access (W-CDMA), Long-Term Evolution (LTE), or the like, when a speech signal is not input, a discontinuous transmission (DTX) technique of not transmitting compressed speech data may be used to save wireless frequency resources.

Figure 3:
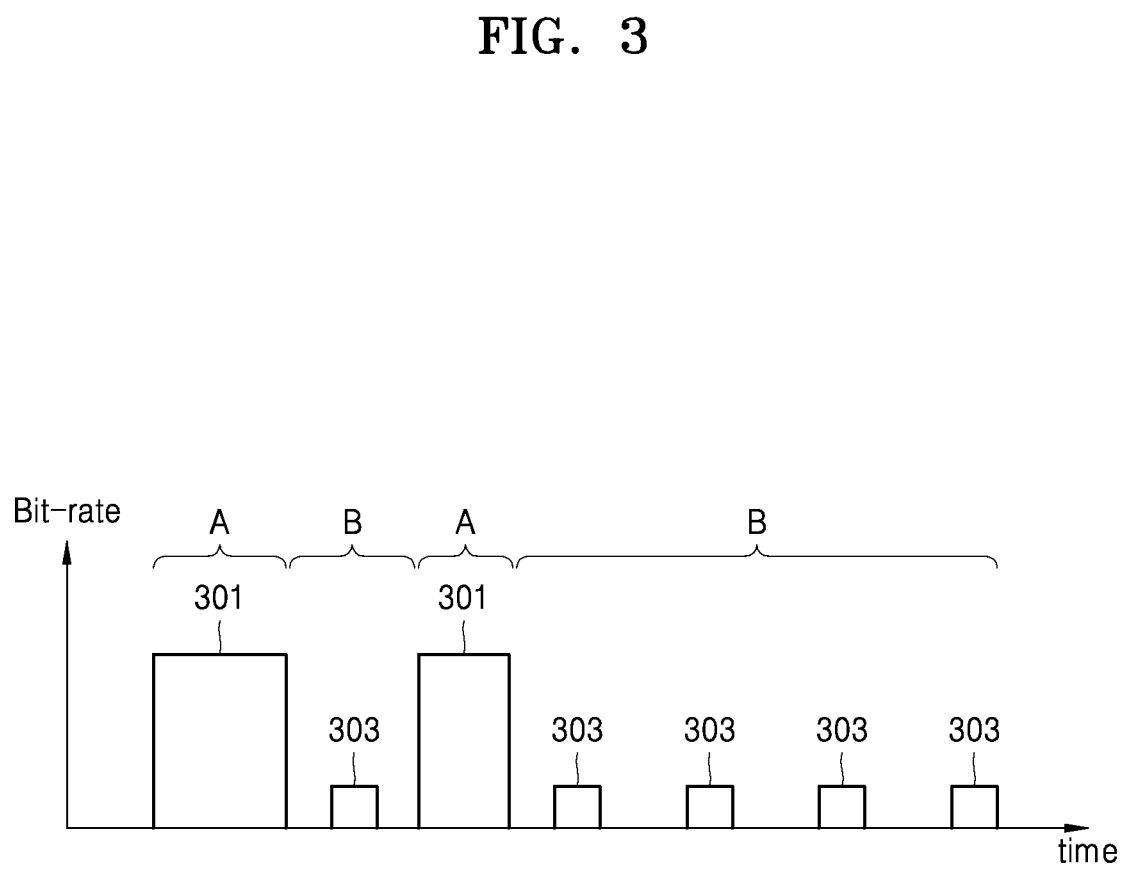

FIG. 3 illustrates output bit-rates of a speech codec to which a DTX technique is applied. For example, in an AMR-WB codec operating at a bit-rate of 12.65 kbps, when a speech signal is input, speech frames 301 compressed at 12.65 kbps may be output. On the other hand, when a speech signal is not input, transmission of speech frames may be discontinued, and only ambient noise information may be loaded to a silence descriptor frame (SID) 303 and may be periodically transmitted at a bit-rate lower than a bit-rate at which a speech frame is transmitted. In FIG. 3, an A period indicates a period in which speech frames are output due to a speech activity by a user, and a B period indicates a period in which an output of speech frames is discontinued, and only ambient noise information is periodically output. As illustrated in FIG. 3, based on the DTX technique, a bit-rate used to deliver information to an opposite terminal device and power consumed by a terminal device may be saved. However, because the DTX technique makes a speech codec intermittently operate, when an audio signal that is not speech but music or noise is input, the input audio signal is not appropriately compressed and output. Therefore, the DTX technique may become a factor of decreasing a call quality, depending on an input signal.

Figure 4:
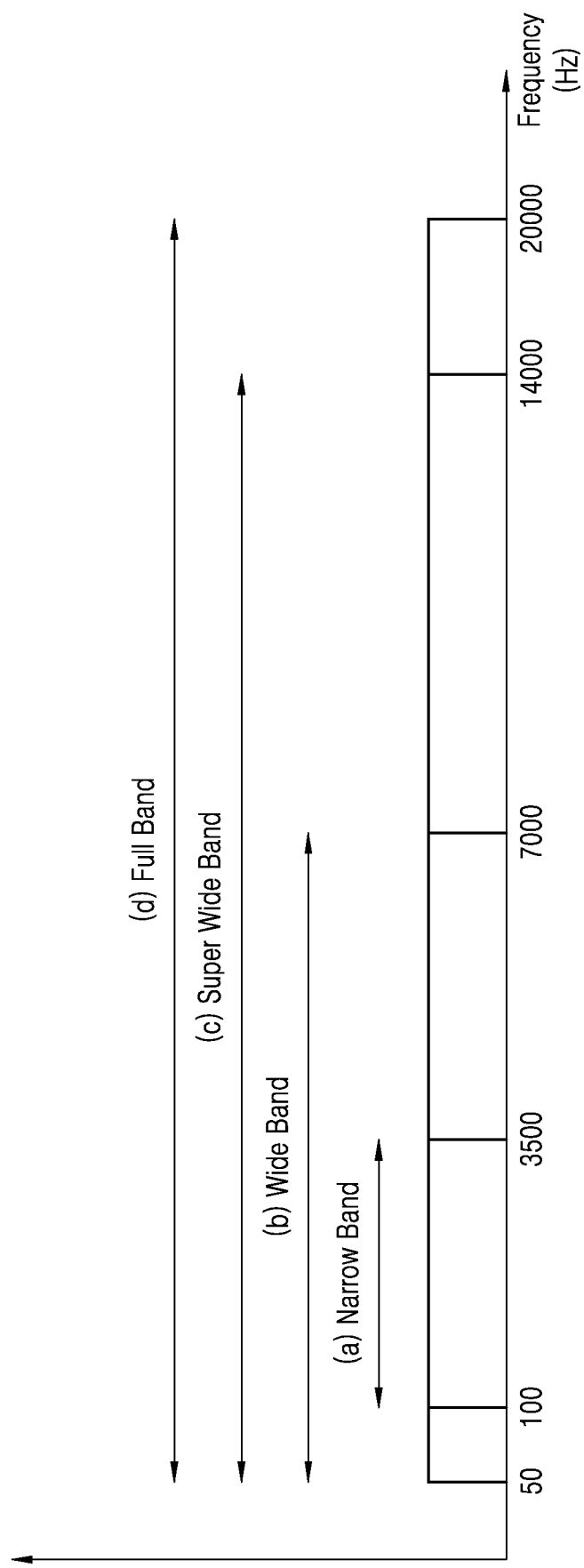
FIG. 4 illustrates an example in which the hearing range of frequencies of a human are divided.

Also, existing speech codes may limit, to decrease a bit-rate, an upper limit of a bandwidth of an audio signal to be compressed, other than a method of using the aforementioned LPC technique and DTX technique. FIG. 4 illustrates a human's speaking and hearing range that is divided into a narrowband, a wideband, a super-wideband, and a full band. The AMR and EVRC codecs may compress a speech signal of the narrowband, and the AMR-WB codec may compress a speech signal of the wideband. In a situation shown in FIG. 1B, when an audio signal of a high frequency band that is not processable by AMR, EVRC, AMR-WB codecs or the like is input to a terminal device using the AMR, EVRC, AMR-WB, codecs or the like, a distorted signal from which an important spectral component is removed is compressed. Because the distorted signal is transmitted to an opposite terminal device, a user of the opposite terminal device experiences significantly high-level noise.

To solve the problem, a terminal device and method according to an embodiment may divide an operating scheme of a codec to compress a speech signal into a speech mode for compressing the speech signal and an audio mode for compressing an audio signal that does not include a speech, the speech signal being transmitted via a mobile communication network. The terminal device according to an embodiment may support the audio mode to provide a high call quality when transmitting audio other than speech or transmitting speeches of two or more users.

Figure 5A:
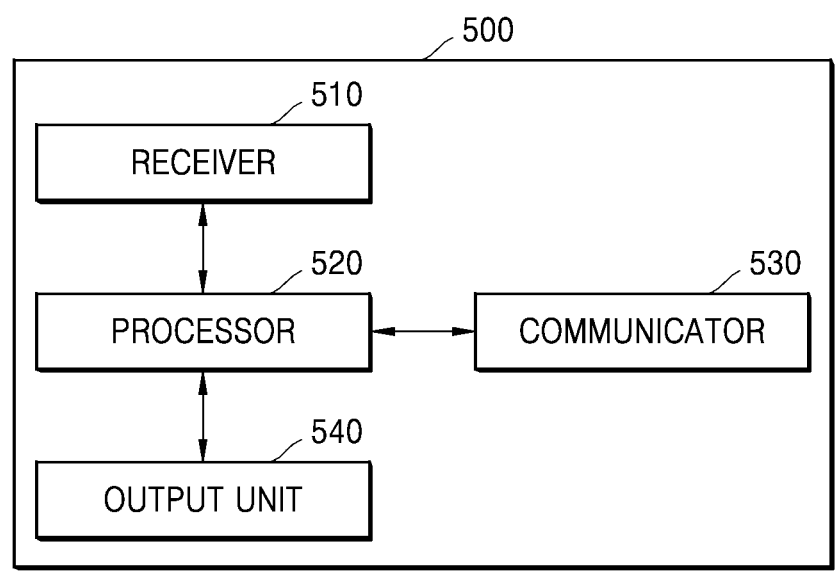
FIGS. 5A and 5B are block diagrams of a terminal device according to an embodiment.
Figure 5B:
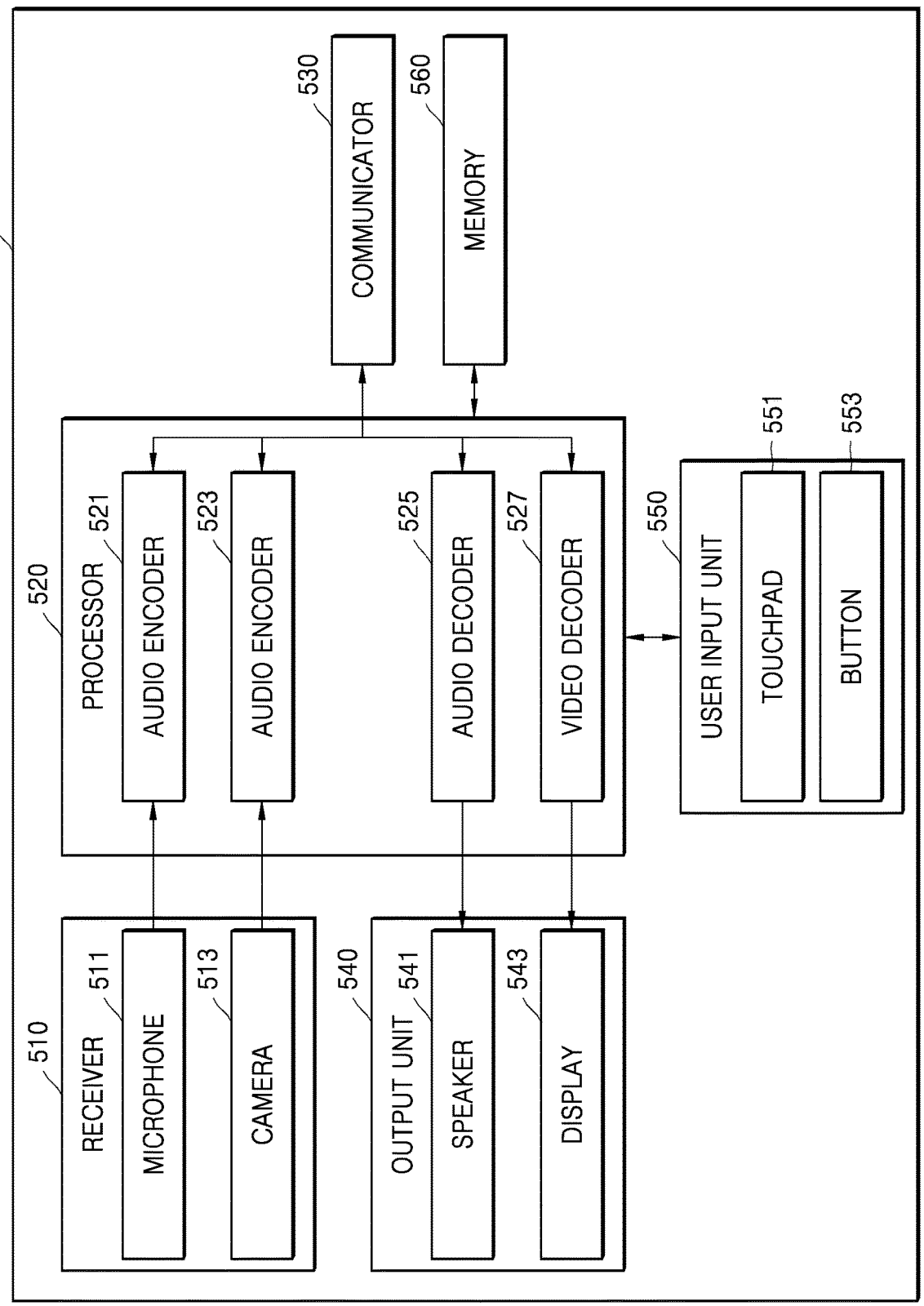

FIGS. 5A and 5B are block diagrams of a terminal device according to an embodiment.

As illustrated in FIG. 5A, a terminal device 500 according to an embodiment may include a receiver 510, a processor 520, a communicator 530, and an output unit 540. However, the terminal device 500 may be embodied with more or less elements than the elements shown in FIG. 5A. For example, as illustrated in FIG. 5B, the terminal device 500 according to an embodiment may further include a user input unit 550 and a memory 560.

For example, the terminal device 500 according to an embodiment may include, but is not limited to, a smartphone, a wearable device, a tablet personal computer (PC), a PC, a smart television (TV), a personal digital assistant (PDA), a laptop, a media player, a micro server, a global positioning system (GPS) device, an electronic book terminal, a terminal for digital broadcasting, navigation, an MP3 player, and a digital camera. The terminal device 500 may be other mobile or non-mobile computing devices, other than the aforementioned devices.

The receiver 510 may receive at least one of an audio transmission signal and a video transmission signal. At least one of the received audio transmission signal and video transmission signal may be a signal received from an external source of the terminal device 500 so as to be transmitted to an external device. The receiver 510 may receive the audio transmission signal by converting external sound into electrical audio data by using a microphone. Alternatively, the receiver 510 may receive, as the video transmission signal, a video obtained by capturing objects outside the terminal device 500 by using a camera. For example, while the terminal device 500 performs a call function, the receiver 510 may receive at least one of a face of a user, a background image, speech of the user, and ambient sound.

The processor 520 may compress at least one of the received audio transmission signal and the received video transmission signal. To compress an audio signal, the processor 520 may operate in an audio mode or a speech mode. The processor 520 according to an embodiment may compress the audio signal in the audio mode, thereby enabling high-quality transmission of a non-speech audio signal.

The speech mode may be a mode of using a compression scheme designed to compress a speech signal, and the audio mode may be a mode of using a compression scheme designed to compress a non-speech audio signal. For example, when the processor 520 uses an Enhanced Speech Services (EVS) codec to compress an audio signal, the speech mode may be a mode of compressing the audio signal by using an algebraic code-excited linear prediction (ACELP) scheme, and the audio mode may be a mode of compressing the audio signal by using a modified discrete cosine transform (MDCT) scheme.

The audio mode may burden a network capacity because the audio mode uses a higher bit-rate compared to an average of the speech mode. Also, in a case where the processor 520 operates in the audio mode when a speech signal is input, a call quality may even deteriorate due to high-level ambient noise included in a compressed signal or a wide bandwidth of the compressed signal. Therefore, the processor 520 according to an embodiment may operate in the audio mode only when it is required to transmit a high-quality non-speech audio signal. The processor 520 may automatically switch between the speech mode and the audio mode and may operate.

The processor 520 may analyze at least one of the audio transmission signal and the video transmission signal which are received by the receiver 510. The processor 520 may select one of the speech mode and the audio mode, based on a result of the analysis. The processor 520 may compress the audio transmission signal, based on the selected mode.

In an embodiment, the processor 520 may select one of the speech mode and the audio mode, based on content of the video transmission signal. For example, when the processor 520 determines that a face of one person is main content of the video transmission signal, the processor 520 may select the speech mode, and for other cases, the processor 520 may select the audio mode.

In another embodiment, the processor 520 may select one of the speech mode and the audio mode, based on content of the audio transmission signal. For example, when the processor 520 determines that it is necessary to transfer background sound or ambient noise of the terminal device 500, the processor 520 may select the audio mode and may switch the terminal device 500 from the speech mode to the audio mode. For other cases, the processor 520 may select the speech mode.

The processor 520 may periodically sample at least one of the video transmission signal and the audio transmission signal. With respect to the video transmission signal, the processor 520 may determine, as a frame, one image sampled at a particular time. With respect to the audio transmission signal, the processor 520 may determine, as a frame, values sampled in a particular period. The processor 520 may process a transmission signal divided by a unit of a frame. The processor 520 may convert each frame of the transmission signal into frequency-domain coefficients, may quantize the frequency-domain coefficients, and thus may generate a bitstream.

Also, the processor 520 may control general operations of the terminal device 500. For example, the processor 520 may control the receiver 510, the communicator 530, and the output unit 540.

The communicator 530 may transmit, to an external device, at least one of a compressed audio transmission signal and a compressed video transmission signal, and may receive, from the external device, at least one of au audio reception signal and a video reception signal. For example, the communicator 530 may communicate with the external device via a mobile communication network. The communicator 530 may communicate with the external device by transceiving speech and data packets from/to a base station managing coverage in which the communicator 530 is located.

Also, the communicator 530 may receive a call condition via a network. The communicator 530 may receive the call condition that is determined by negotiating with the external device via the network, the external device being a target of a call. The determined call condition may be expressed as a Session Description Protocol (SDP) message. The call condition may include conditions related to a bit-rate and a bandwidth.

The output unit 540 may output the audio reception signal received from the external device. The output unit 540 may output a screen image on which the terminal device 500 performs a call function. The output unit 540 may output the audio reception signal by converting the audio reception signal to sound by a speaker. The output unit 540 may output the audio reception signal to earphones connected to the terminal device 500.

Alternatively, the output unit 540 may output the video reception signal via a display. For example, while the terminal device 500 performs a call function, the output unit 540 may output a face of another person, an image of a surrounding environment where the external device is located, speech of the other person, ambient sound, or the like. Signals output by the output unit 540 may be signals restored by decoding, by the processor 520, a bitstream received by the communicator 530.

Also, the output unit 540 may output at least one of an audio transmission signal and a video transmission signal received by the receiver 510. The output unit 540 may output an image in a picture-in-picture (PIP) form on a screen on which the video reception signal is displayed, the image being generated from the video transmission signal.

As illustrated in FIG. 5B, the terminal device 500 according to an embodiment may further include the user input unit 550 and the memory 560.

The user input unit 550 may receive a user input for controlling the terminal device 500. For example, the user input unit 550 may receive a touch input via a touchpad 551 or may receive a push input via a button 553, but the user input is not limited thereto, and the user input unit 550 may receive various user inputs.

The memory 560 may store at least one of an audio transmission signal, a video transmission signal, an audio reception signal, a video reception signal, and a call condition. Also, the memory 560 may store commands executed by the processor 520 so as to control the terminal device 500.

Some or all of blocks included in the processor 520 illustrated in FIG. 5B may be embodied as hardware and/or software configurations to perform a specific function. Functions performed by the blocks illustrated in FIG. 5B may be implemented by at least one microprocessor or circuit configurations for the functions. Some or all of blocks illustrated in FIG. 5B may be a software module consisting of various programming languages or script languages executed by the processor 520.

For input and output of an audio signal, the terminal device 500 may include a microphone 511 to receive the audio signal, an audio encoder 521 to compress the audio signal, an audio decoder 525 to decode the compressed audio signal, and a speaker 541 to output the audio signal.

For input and output of a video signal, the terminal device 500 may include a camera 513 to receive the video signal, a video encoder 523 to compress the video signal, a video decoder 527 to decode the compressed video signal, and a display 543 to output the video signal.

The communicator 530 may include a packet-based network interface to transmit signals compressed by a unit of a packet. The communicator 530 may receive the signals compressed by the unit of a packet via the interface. The communicator 530 may be connected to a 3rd Generation Partnership Project (3GPP) layer 2 interface of a modem to access a communication network such as 2/3G or LTE. The communicator 530 is connected to an interface of a corresponding network so as to access another network such as a wired network, Internet, WiFi, or the like.

An operating method of the audio encoder 521 and the audio decoder 525 may be determined based on an input audio signal or at least one of a video signal, a user input, and a network signal. Based on negotiation for communication with a network and an opposite call terminal, a bit-rate, a bandwidth, or the like may be determined. The terminal device 500 may compress an audio signal, based on the determined bit-rate and the determined bandwidth, and may transmit the compressed audio signal via the network. The terminal device 500 may receive and reconstruct an audio signal transmitted by an opposite terminal device. The audio encoder 521 according to an embodiment may compress, in further consideration of a result of analyzing call content, an audio transmission signal according to a mode selected from among the speech mode and the audio mode.

Figure 6:
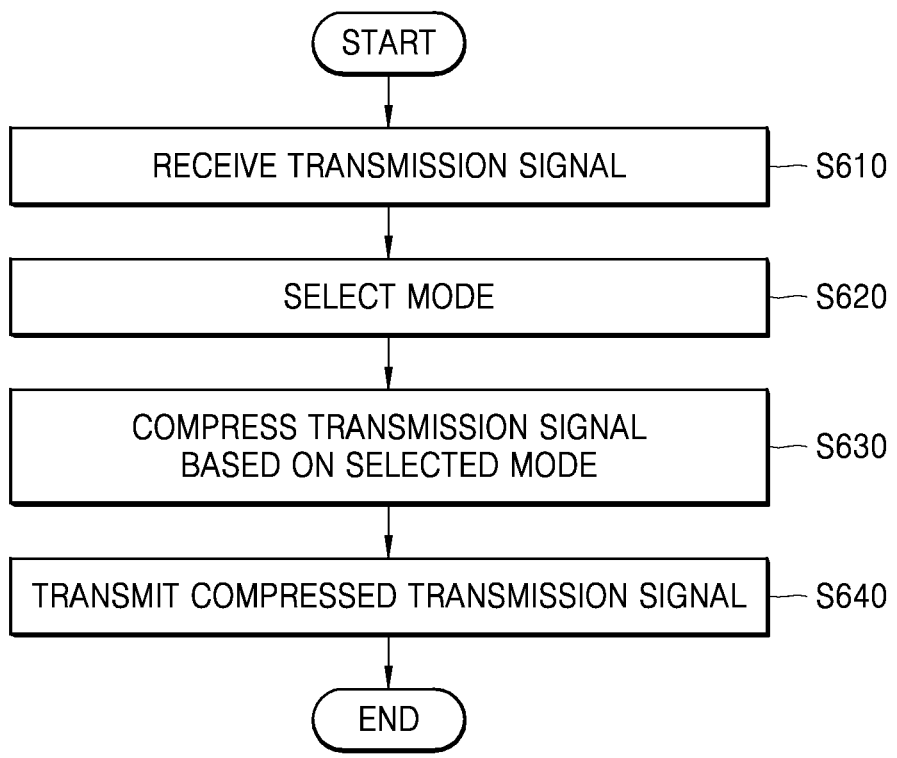
FIG. 6 is a flowchart of a method of performing a call function, the method being performed by a terminal device according to an embodiment.

Hereinafter, with reference to FIG. 6, a method of performing a call function with at least one external device, the method being performed by the terminal device 500 according to an embodiment, will now be described. Each operation of the method to be described below may be performed by each configuration of the terminal device 500, and descriptions with respect to FIG. 5 may be applied to FIG. 6. Overlapping descriptions are omitted.

In S610, the terminal device 500 may receive at least one of an audio transmission signal and a video transmission signal to be transmitted to an external device. For example, when a user talks over a screen of the terminal device 500 while viewing the face of another person on the screen, the terminal device 500 may receive, as the audio transmission signal, speech of the other person via a microphone, and may receive, as the video transmission signal, a captured image of the face of the other person.

The terminal device 500 may be connected to the at least one external device via a network and may transceive at least one of an audio signal and a video signal from/to the at least one external device, thereby performing the call function. The external device may be an opposite terminal device with which the terminal device 500 performs the call function.

In S620, the terminal device 500 may select, based on call content, a mode of compressing an audio signal that is appropriate with respect to a situation. The terminal device 500 according to an embodiment may operate in an audio mode or a speech mode in compressing an audio signal. The terminal device 500 may analyze at least one of the audio transmission signal and the video transmission signal, and may select one of the speech mode and the audio mode, based on a result of the analysis.

When the terminal device 500 determines that it is required to compress a speech signal of a human, the terminal device 500 may select the speech mode, and when the terminal device 500 determines that it is required to compress a signal in which a plurality of human speeches are overlapped or an audio signal other than a speech signal, the terminal device 500 may select the audio mode. The speech mode may be a mode of using a compression scheme designed to compress a speech signal, and the audio mode may be a mode of using a compression scheme designed to compress a non-speech audio signal.

In detail, the speech mode may be a mode of using a compression scheme of changing at least one of a bit-rate and a bandwidth, according to the audio transmission signal. The audio mode may be a mode of using a compression scheme of using at least one of a maximum bit-rate and a maximum bandwidth that are allowed in a call condition received via the network, regardless of the audio transmission signal.

For example, the terminal device 500 may use an EVS codec to compress the audio signal, may compress the audio transmission signal by using an ACELP scheme as the speech mode, and may compress the audio transmission signal by using an MDCT scheme as the audio mode. The terminal device 500 according to an embodiment which supports the EVS codec will be described in detail with reference to FIG. 7 below.

Alternatively, the speech mode according to an embodiment may be a mode of performing at least one of DTX, LPC, and noise suppression (NS) in compressing the audio transmission signal. In this regard, the audio mode may be a mode of discontinuing performing of at least one of DTX, LPC, and NS in compressing the audio transmission signal, and amplifying an output of a microphone receiving the audio transmission signal.

For example, the terminal device 500 may select one of the speech mode and the audio mode, based on a result of analyzing the video transmission signal. As illustrated in FIG. 1A, when the user holds the terminal device 500 in his or her hand at a short distance in front of the user, there is a high probability that the terminal device 500 receives a speech signal having a high volume. When a possibility that a received audio transmission signal includes a speech signal is high, the terminal device 500 has to operate in the speech mode.

The terminal device 500 may analyze the video transmission signal, and when a face of one person is main content of a video, the terminal device 500 may select the speech mode. On the other hand, when two or more faces are included in the video or a background or a landscape is content of the video, the terminal device 500 may select the audio mode.

In detail, the terminal device 500 may detect a face of a human from each of a plurality of frames included in the video transmission signal. When the number of faces detected from the video transmission signal is 1 and an area of the detected face in the video is greater than a threshold area, the terminal device 500 may select the speech mode. On the other hand, when the number of detected faces is equal to or greater than 2 or an area of the detected face in the video is equal to or less than the threshold area, the terminal device 500 may select the audio mode. A method of selecting an operation mode based on a result of analyzing a video transmission signal will be described in detail with reference to FIG. 16 below.

As another example, the terminal device 500 may select one of the speech mode and the audio mode, based on a result of analyzing the audio transmission signal. As illustrated in FIG. 1B, when not a human but a surrounding environment of a terminal device is captured and transmitted, there is a high probability that the terminal device 500 receives a non-speech audio signal. Alternatively, in an emergency situation, it may be required for the terminal device 500 to transmit ambient sound. In this case, the terminal device 500 has to operate in the audio mode.

The terminal device 500 may analyze the audio transmission signal, and may select the speech mode when a speech signal is included in the audio transmission signal. On the other hand, the terminal device 500 may select the audio mode when the audio transmission signal does not include a speech signal. When a speech signal is not sensed for a certain time during an emergency call, the terminal device 500 may deactivate a pre-processing function, such as NS, of erasing an input signal other than a speech signal so as to transmit a non-speech audio signal with high sensitivity. When a speech signal is not sensed for a certain time during an emergency call, the terminal device 500 may deactivate the pre-processing function, according to a user input.

In detail, the terminal device 500 may detect a human speech from each of a plurality of frames included in the audio transmission signal. The terminal device 500 may select one of the speech mode and the audio mode, based on the number of frames from which the human speech is not detected. The terminal device 500 may select the speech mode when a proportion of the frames from which the human speech is not detected among the plurality of frames is equal to or less than a threshold proportion. On the other hand, the terminal device 500 may select the audio mode when a proportion of the frames from which the human speech is not detected among the plurality of frames is greater than the threshold proportion. A method of selecting an operation mode based on a result of analyzing an audio transmission signal will be described in detail with reference to FIG. 18 below.

In S630, the terminal device 500 may compress the audio transmission signal, based on the selected mode.

The terminal device 500 may process the audio transmission signal in a unit of a frame. The terminal device 500 may convert time-domain audio signal samples into frequency-domain coefficients. The terminal device 500 may quantize the frequency-domain coefficients and thus may generate a bitstream.

When the speech mode is selected, the terminal device 500 may compress the audio transmission signal by changing at least one of a bit-rate and a bandwidth of the audio transmission signal, based on the audio transmission signal. Alternatively, when the audio mode is selected, the terminal device 500 may compress the audio transmission signal by using at least one of a fixed bit-rate and a fixed bandwidth. For example, when the audio mode is selected, the terminal device 500 may compress the audio transmission signal by using at least one of a maximum bit-rate and a maximum bandwidth which are allowed within a call condition received via the network.

The terminal device 500 having selected the audio mode may compress the audio transmission signal to have at least one of a maximum bit-rate and a maximum bandwidth that are allowed within a current call condition, regardless of the audio transmission signal. In this regard, the terminal device 500 may compress and transmit the audio transmission signal without a blank, by not using DTX. Also, to process an audio transmission signal having a bandwidth broader than a speech signal, the terminal device 500 may adjust an output and a noise removing function of the microphone which were set to process the speech signal.

For example, when the speech mode is selected, the terminal device 500 using the EVS codec may compress the audio transmission signal by using the ACELP scheme. When the audio mode is selected, the terminal device 500 may compress the audio transmission signal by using the MDCT scheme. However, in the terminal device 500 using the EVS codec, the audio mode is not limited to compression of an audio transmission signal by using the MDCT scheme.

When an MDCT core is available at a current bit-rate, the terminal device 500 having selected the audio mode may compress the audio transmission signal using the MDCT core, not ACELP. On the other hand, when a maximum bit-rate satisfying a current call condition does not support the MDCT core, the terminal device 500 having selected the audio mode may compress the audio transmission signal by using an audio coding mode from among various operation modes of an ACELP compression core.

The terminal device 500 according to an embodiment which supports the EVS codec will be described in detail with reference to FIG. 7 below.

In S640, the terminal device 500 may transmit the compressed audio transmission signal to the external device.

The terminal device 500 may be connected to the at least one external device via the network. When the terminal device 500 is located in coverage of the network, the terminal device 500 may transmit multimedia call content or data. The terminal device 500 may transmit speech packet including the compressed audio transmission signal and data packets to a base station, thereby transmitting the compressed audio transmission signal to the external device via a mobile communication network. Also, the terminal device 500 may receive an audio reception signal from the external device via a corresponding base station.

Figure 7:
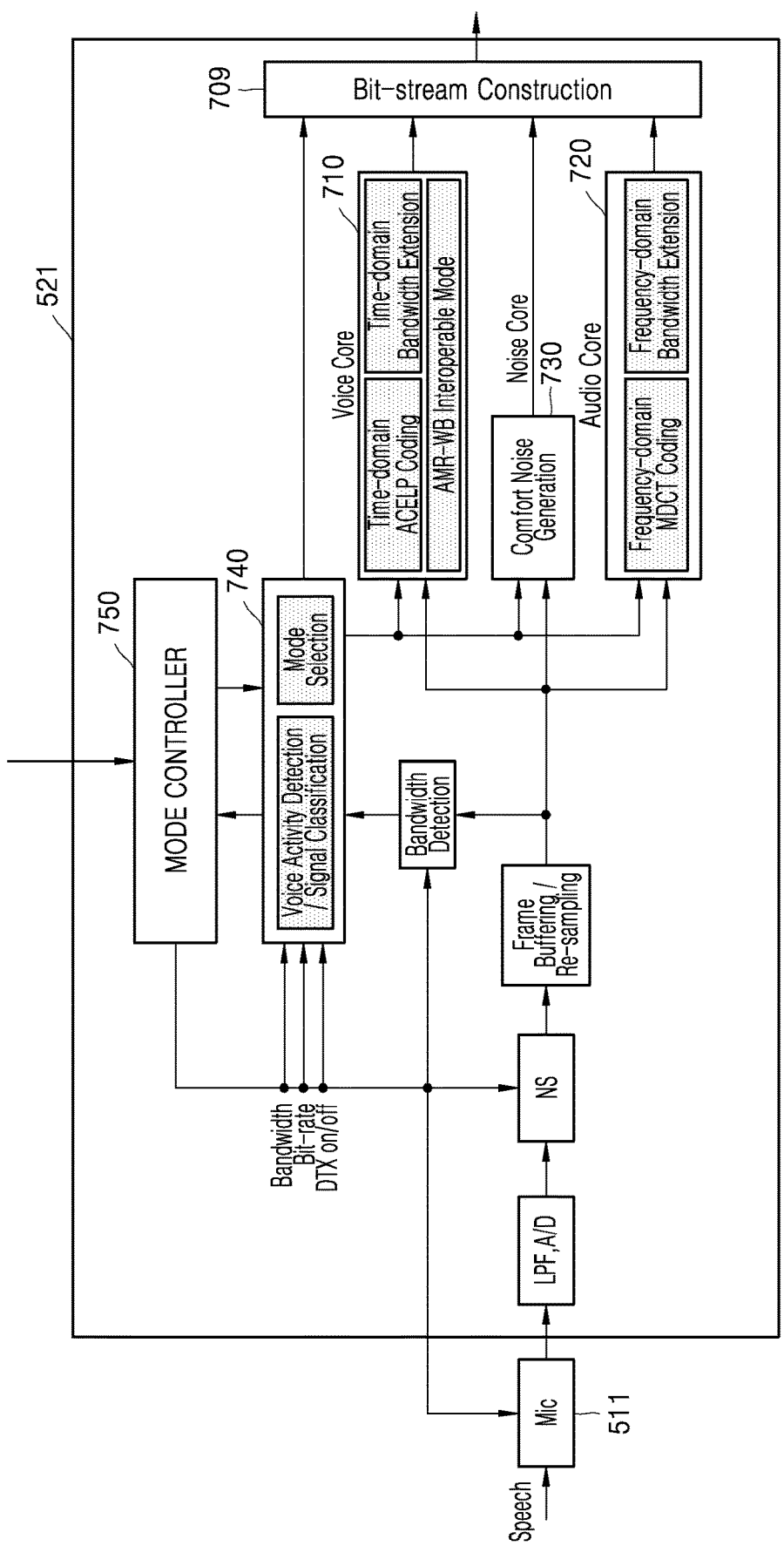
FIG. 7 illustrates a block diagram of an audio encoder that supports an Enhanced Voice Services (EVS) codec, according to an embodiment.

FIG. 7 illustrates a block diagram of an audio encoder that supports an EVS codec, according to an embodiment.

Some or all of blocks illustrated in FIG. 7 may be embodied as hardware and/or software configurations to perform a specific function. Functions performed by the blocks illustrated in FIG. 7 may be implemented by at least one microprocessor or circuit configurations for the functions. Some or all of blocks illustrated in FIG. 7 may be a software module consisting of various programming languages or script languages executed by the processor 520.

The EVS codec may compress a speech input signal by using an ACELP scheme that is one of methods of LPC or may compress an audio input signal other than a speech signal by using an MDCT scheme.

Figure 8A:
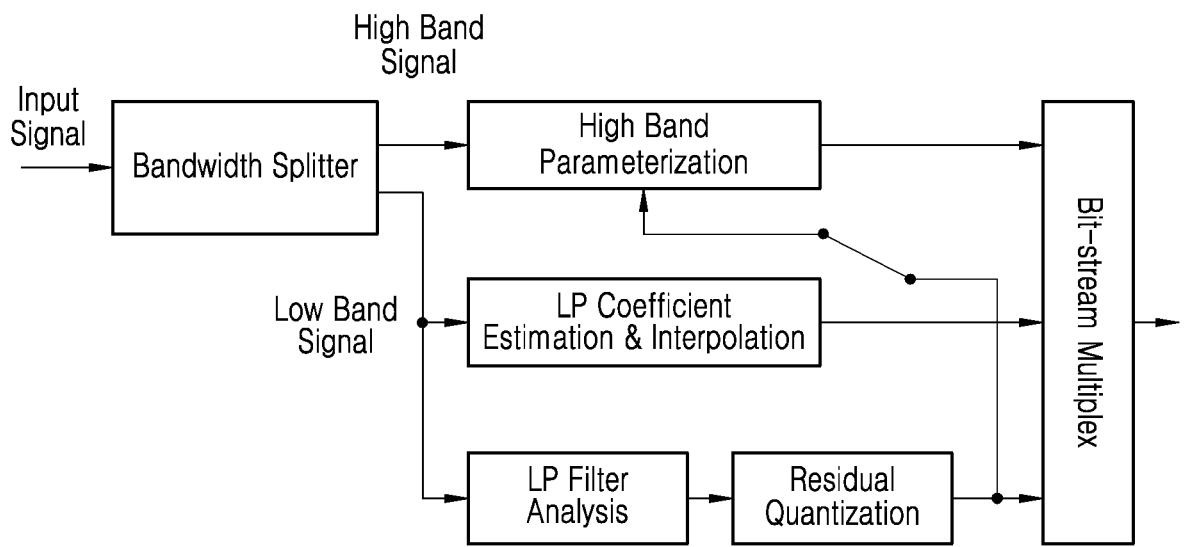
FIGS. 8A and 8B illustrate block diagrams of a voice core and an audio core included in a processor according to an embodiment.
Figure 8B:
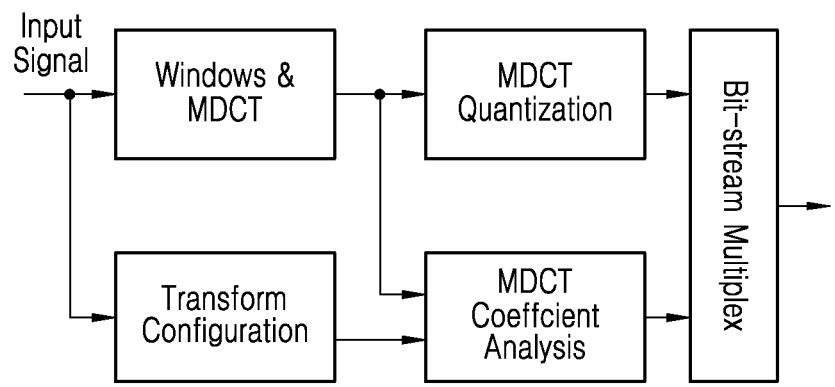

Based on a result of analyzing an input signal, the audio encoder 521 using the EVS codec may compress the input signal by using a voice core 710 according to the ACELP scheme, or may compress the input signal by using an audio core 720 according to the MDCT scheme. When an audio transmission signal mainly includes a speech, the audio encoder 521 operating in a speech mode discontinues, by applying DTX thereto, an output of a compressed input signal in absence of a speech signal, and then periodically transmits noise information compressed by using a noise core 730. A block 740 of the audio encoder 521 may determine which core among three compressed cores 710, 720, and 730 is to be used, based on a characteristic of the input signal. FIG. 8A illustrates a structure of the voice core 710 of FIG. 7, and FIG. 8B illustrates a structure of the audio core 720 of FIG. 7.

In this regard, the audio encoder 521 according to an embodiment may include a mode controller 750 and thus may select an audio signal compression mode appropriate for a situation, based on call content. The mode controller 750 may ignore a result of determining, by the block 740, which core is to be used, and may determine to use a core corresponding to a compression mode selected based on at least one of an audio transmission signal and a video transmission signal. The mode controller 750 may control the block 740 to increase a bit-rate and a bandwidth for compression of the input signal up to a maximum bit-rate and a maximum bandwidth which are allowed in a current call condition.

The mode controller 750 may select one of the speech mode and an audio mode, based on at least one of the audio transmission signal and the video transmission signal which are received by the receiver 510 of FIG. 5. The mode controller 750 may perform compression by using the ACELP scheme or the MDCT scheme, based on the selected mode, or may determine whether to discontinue the output by applying DTX thereto.

For example, when the audio mode is selected, the mode controller 750 may determine to use a compression scheme of compressing the audio transmission signal to have at least one of the maximum bit-rate and the maximum bandwidth which are allowed in the call condition. Also, when the audio mode is selected, the mode controller 750 may discontinue performing of at least one of DTX and NS. When the audio mode is selected, the mode controller 750 may amplify an output of the microphone 511, and may increase sensitivity of the microphone 511. When the audio mode is selected, the mode controller 750 may control a speech activity detection (VAD) module not to perform DTX, thereby allowing an audio frame, not a blank nor an SID frame, to be constantly output.

As illustrated in FIG. 4, a frequency bandwidth of an audio signal may be divided into a narrowband, a wideband, a super-wideband, and a full band, and sampling rates of 8, 16, 32, and 48 kHz may be respectively applied to the bands. In a case where a same audio signal is processed, when a sampling rate is increased, a high frequency component of the input signal may be further included.

According to an embodiment, when the audio encoder 521 operates in the audio mode, the audio encoder 521 may encode the audio signal to have the maximum bit-rate and the maximum bandwidth that are allowed in the current call condition, regardless of a characteristic of the input audio signal. On the other hand, when the audio encoder 521 operates in the speech mode, the audio encoder 521 may reflect content of the input audio signal, and thus may apply LPC or DTX or may limit a bandwidth of the audio signal to be processed.

FIGS. 9 and 10 are diagrams of comparisons between a compressed audio signal output in the speech mode and a compressed audio signal output in the audio mode, with respect to a bandwidth and a bit-rate, the compressed audio signals being output by the audio encoder 521 using the EVS codec.

As illustrated in FIG. 9, the audio encoder 521 in the speech mode may output a signal with varying bandwidths according to an input audio signal. On the other hand, the audio encoder 521 in the audio mode may output a signal having a bandwidth fixed at a maximum value that satisfies a current call condition.

As illustrated in FIG. 10, the audio encoder 521 in the speech mode may output a signal with varying bit-rates according to an input audio signal. On the other hand, the audio encoder 521 in the audio mode may output a signal having a bit-rate fixed at a maximum value that satisfies the current call condition.

FIG. 11 illustrates a call condition of the terminal device 500 using EVS.

The terminal device 500 may determine a call condition by negotiating with an external device via a network, the external device being a target of a call. The determined call condition may be expressed as a session description protocol (SDP).

According to a bit-rate condition 1101 included in an SDP message illustrated in FIG. 11, the terminal device 500 may use bit-rates of 13.2 to 24.4 kbps (i.e., bit-rates of 13.2, 16.4, and 24.4 kbps). According to a bandwidth condition 1103, the terminal device 500 may use a narrowband through a super-wideband (i.e., a wideband, and a super-wideband).

For example, when the terminal device 500 has the call condition shown in FIG. 11, the terminal device 500 operating in an audio mode may compress an audio signal by using a bit-rate of 24.4 kbps and a super-wideband, not using DTX.

FIG. 12 illustrates coding schemes of a general EVS codec which are applied according to characteristics of a bit-rate, a bandwidth and an audio signal. As illustrated in FIG. 12, a plurality of coding techniques may be used in the EVS codec.

For example, the terminal device 500 according to an embodiment may determine to compress an audio signal by using an ACELP core in signal classification performed in the block 740 of FIG. 7, based on an allocation table shown in FIG. 12 and the input audio signal. However, as illustrated using arrows of FIG. 12, the terminal device 500 operating in the audio mode according to an embodiment may ignore a result of the determination and may forcibly allow the audio signal to be compressed by using an MDCT core.

Figure 13:
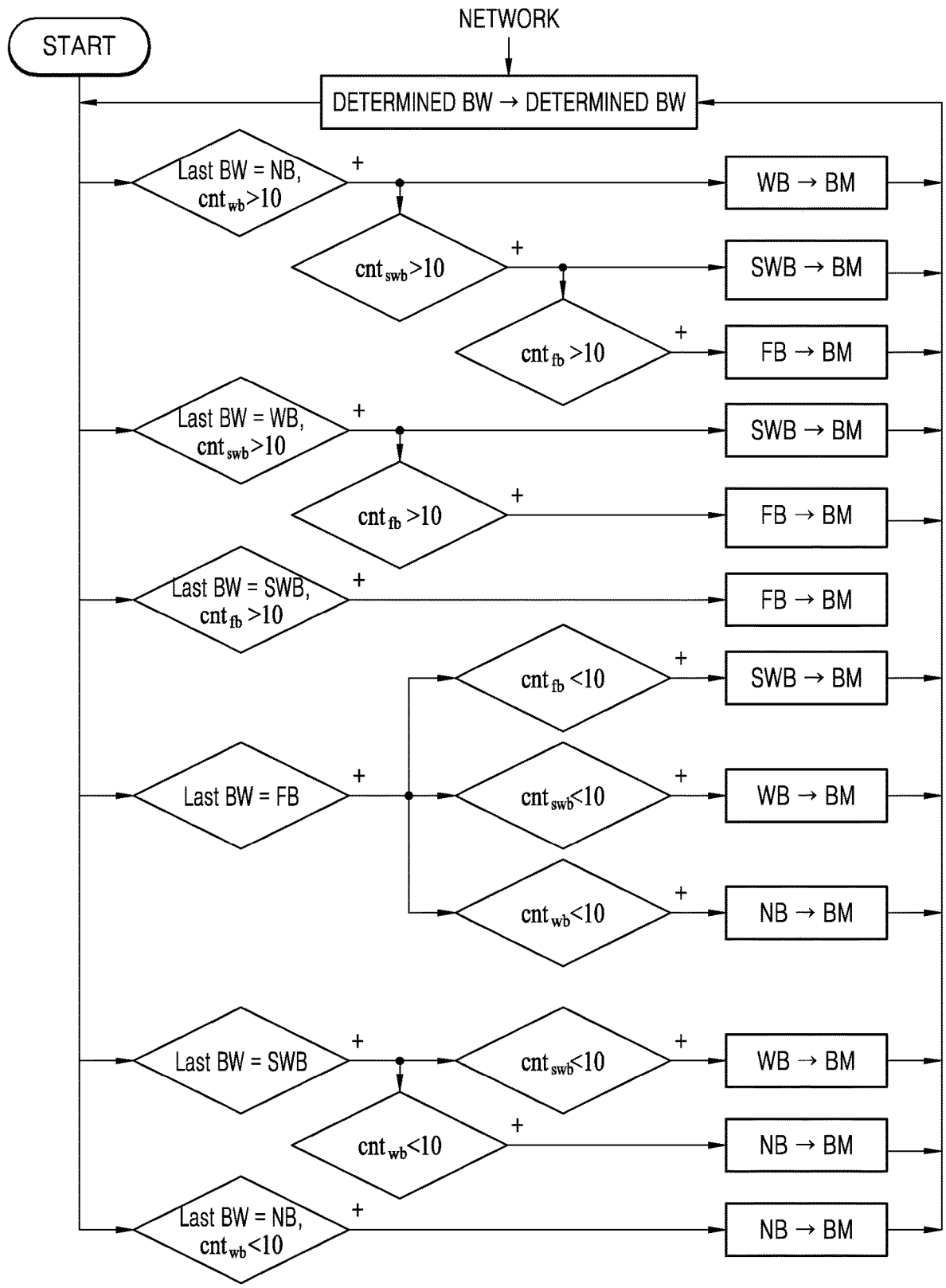

As illustrated in FIG. 13, an ACELP compression core may operate in a plurality of operation modes. For example, the ACELP compression core may operate in an unvoiced coding (UC) mode, a voiced coding mode, a transition coding (TC) mode, an audio coding mode, an inactive coding mode, and a generic coding mode. The terminal device 500 may determine a coding mode according to whether a current frame has been activated, whether the current frame has been encoded in an AC mode, whether a speech signal is included, or the like.

When a maximum bit-rate satisfying a current call condition does not support the MDCT core, the terminal device 500 operating in the audio mode according to an embodiment may use a mode as an audio coding mode, the mode being determined, based on the input audio signal, from among the plurality of operation modes of the ACELP compression core.

Figure 14:
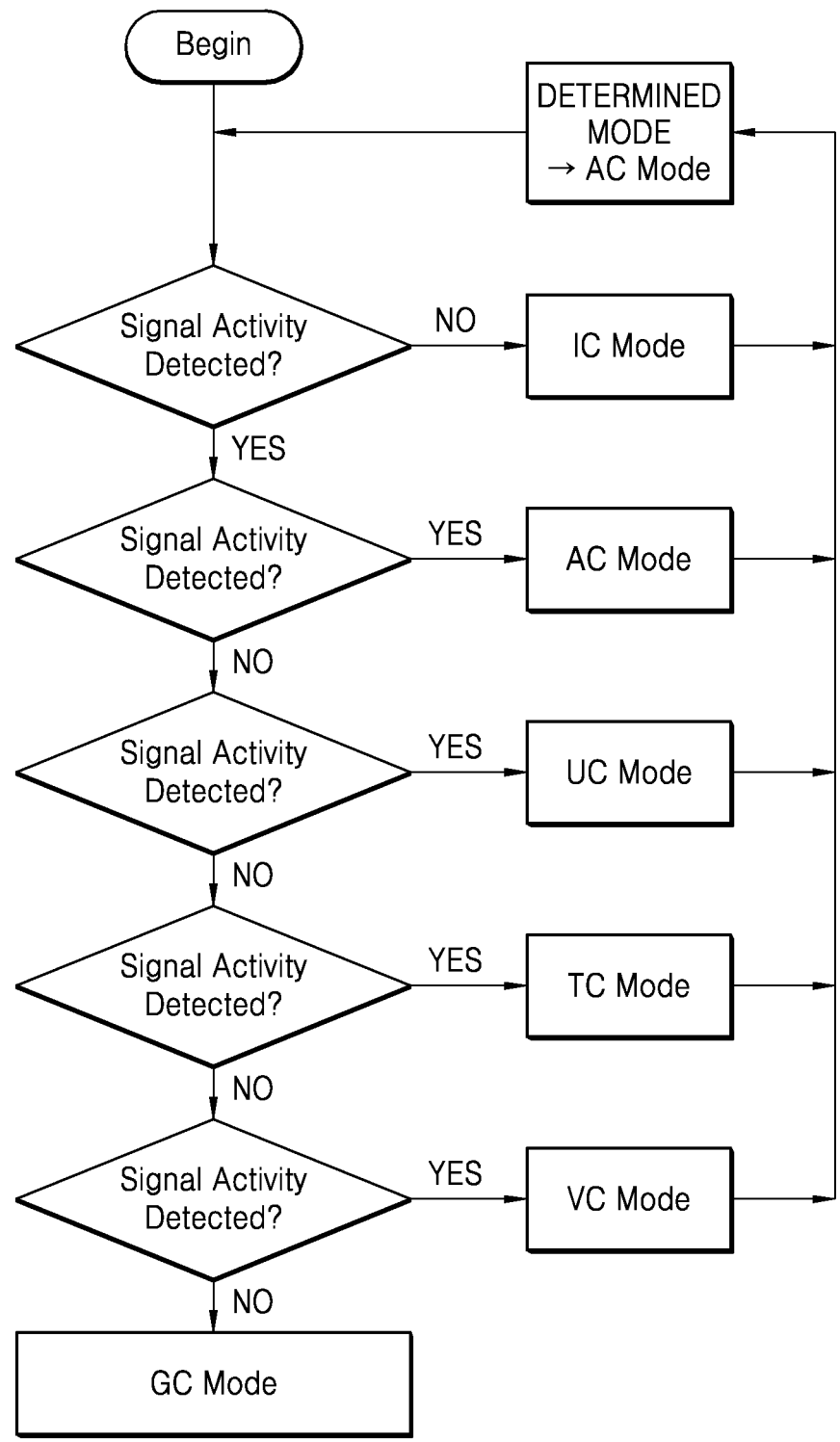

The terminal device 500 may detect a bandwidth of the input audio signal. Information about the detected bandwidth is used for a codec to operate in an optimized mode. For example, when a sampling rate of the input audio signal is 32 kHz whereas energetically meaningful spectral content above 8 kHz does not exist, the codec may operate in a WB mode. FIG. 13 illustrates logic of selecting, by the terminal device 500, a bandwidth. The terminal device 500 operating in the audio mode according to an embodiment may replace a bandwidth as a maximum bandwidth satisfying the current call condition, the bandwidth being determined based on the input audio signal according to logic shown in FIG. 14.

With reference to FIGS. 7 to 14, a case in which the terminal device 500 according to an embodiment supports the EVS codec has been described. The terminal device 500 according to an embodiment may solve a problem of deterioration in a call quality by maximally using a structure of the EVS codec. When it is necessary for the terminal device 500 to exactly compress and transmit non-speech ambient audio of the terminal device 500, the terminal device 500 may automatically switch a compression scheme from a speech mode to the audio mode. For example, the speech mode may be a mode of compressing an input audio signal by using an existing speech compression scheme, and the audio mode may be a mode of compressing the input audio signal by using a scheme that is newly defined in the present specification.

The terminal device 500 according to an embodiment is not limited to a case where the terminal device 500 supports the EVS codec. The terminal device 500 may support EVRC, AMR, AMR-WB, and other speech compression codecs. The codecs such as EVRC, AMR, AMR-WB, or the like may operate using a fixed bandwidth. For example, the terminal device 500 supporting the AMR-WB codec may include only an ACELP compression core, and may compress speech at a bandwidth fixed at a wideband.

In this case, the terminal device 500 according to an embodiment may compress an audio signal by using a same bandwidth for a case of operating in the audio mode and a case of operating in the speech mode. However, the terminal device 500 may compress an audio transmission signal by performing at least one of DTX and NS as the speech mode. The terminal device 500 may discontinue performing of at least one of DTX and NS, as the audio mode, may amplify an output of an microphone receiving the audio transmission signal, and thus may compress the audio transmission signal.

The audio mode may burden a network capacity because the audio mode uses a higher bit-rate compared to an average of the speech mode. Also, in a case where the terminal device 500 operates in the audio mode when a speech signal is input, a call quality may even deteriorate due to high-level ambient noise is included or a signal having a wide bandwidth is output. Therefore, the terminal device 500 according to an embodiment may operate in the audio mode only when it is required to transmit a high-quality non-speech audio signal.

When the terminal device 500 according to an embodiment determines that it is required to compress a speech signal of a human, the terminal device 500 may select the speech mode, and when the terminal device 500 determines that it is required to compress a speech signal of a plurality of humans or an audio signal other than a speech signal, the terminal device 500 may select the audio mode. The terminal device 500 may analyze at least one of an audio transmission signal and a video transmission signal, and may select one of the speech mode and the audio mode, based on a result of the analysis.

Figure 15A:
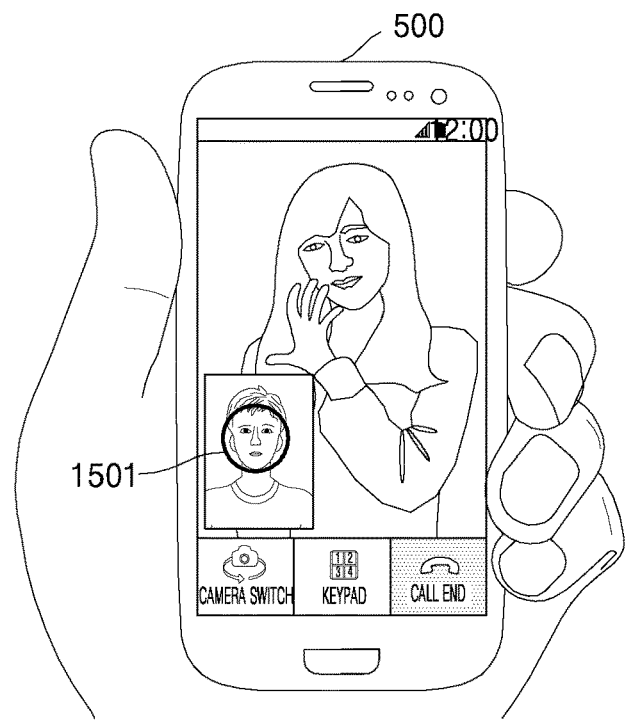
FIGS. 15A and 15B are diagrams for describing a method of analyzing a video signal input to a terminal device, according to an embodiment.
Figure 15B:
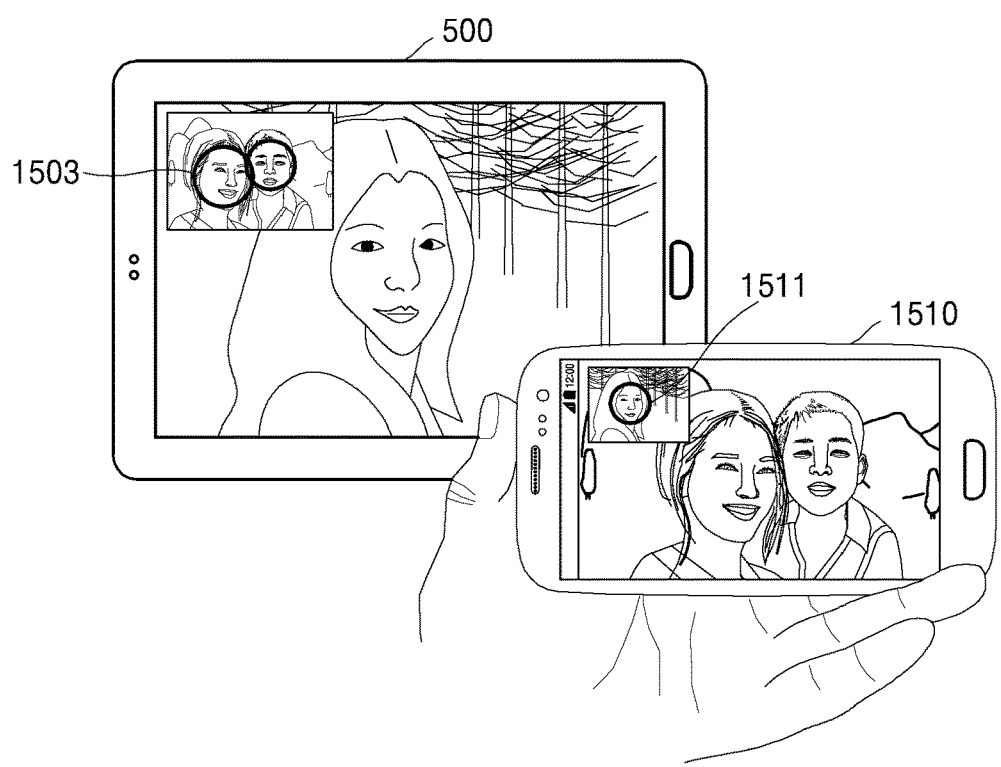

FIGS. 15A and 15B are diagrams for describing a method of analyzing a video signal input to a terminal device, according to an embodiment.

The terminal device 500 may analyze at least one of an audio transmission signal and a video transmission signal, and may select one of a speech mode and an audio mode, based on a result of the analysis.

The terminal device 500 according to an embodiment may automatically switch between the speech mode and the audio mode, based on content of a video input while a video call function is being performed.

When a face of one person is main content of the video, the terminal device 500 may select the speech mode, and when faces of two or more people are included in the video or the content of the video is not about a human but about a background or a landscape, the terminal device 500 may operate in the audio mode.

Accordingly, the terminal device 500 according to an embodiment may detect, as illustrated in FIGS. 15A and 15B, a face from a video transmission signal that is input for transmission to an external device.

FIGS. 15A and 15B illustrate the terminal device 500 that displays a video transmission signal in a PIP form on a screen.

As illustrated in FIG. 15A, an image 1501 corresponding to the video transmission signal transmitted from the terminal device 500 to the external device may be displayed. In FIG. 15A, a region corresponding to a human face in the image 1501 is marked using a circle. When an area of the region corresponding to the human face is maintained over a particular proportion of an area of the image 1501 for a particular time, the terminal device 500 may switch an operation mode to the speech mode. According to a method of detecting or recognizing a human face from a video transmission signal, a region corresponding to the human face may have various shapes other than a circle.

Referring to FIG. 15B, the terminal device 500 may display an image 1503 in a PIP form on a screen on which a video reception signal received from an opposite terminal device 1510 is displayed. The image 1503 may correspond to a video transmission signal including faces of two people performing a video call using the terminal device 500. In FIG. 15B, regions corresponding to the faces of two people in the image 1503 are marked using circles.

The opposite terminal device 1510 may display an image 1511 in a PIP form on a screen on which a video signal received from the terminal device 500 is displayed. The image 1511 may include a face of one person performing a video call using the opposite terminal device 1510. A region corresponding to the face of one person in the image 1511 may be marked using a circle.

As illustrated in FIG. 15B, when at least two users perform a video call through the terminal device 500, the terminal device 500 may receive an input of an audio signal including speech signals of two users. The input audio signal including the speech signals of two people may have a characteristic different from an input audio signal including a speech signal of one person. When a situation in which a plurality of users simultaneously speak is maintained for a certain time, the terminal device 500 may operate in the audio mode.

The terminal device 500 according to an embodiment may analyze content of an image included in the video transmission signal, and when the content of the image does not include a human face or includes faces of at least two people, the terminal device 500 may switch an audio signal compression mode to the audio mode.

In order for the terminal device 500 to automatically switch a compression mode to the audio mode, the terminal device 500 may calculate the number of faces of people included in the content of the image from the video transmission signal and a proportion of a human face to an area of a whole image. When a proportion of a face of one person to an area of a whole image is maintained over a certain proportion for a certain time, the terminal device 500 may operate in the speech mode, and for other situations, the terminal device 500 may switch to and operate in the audio mode.

Figure 16:
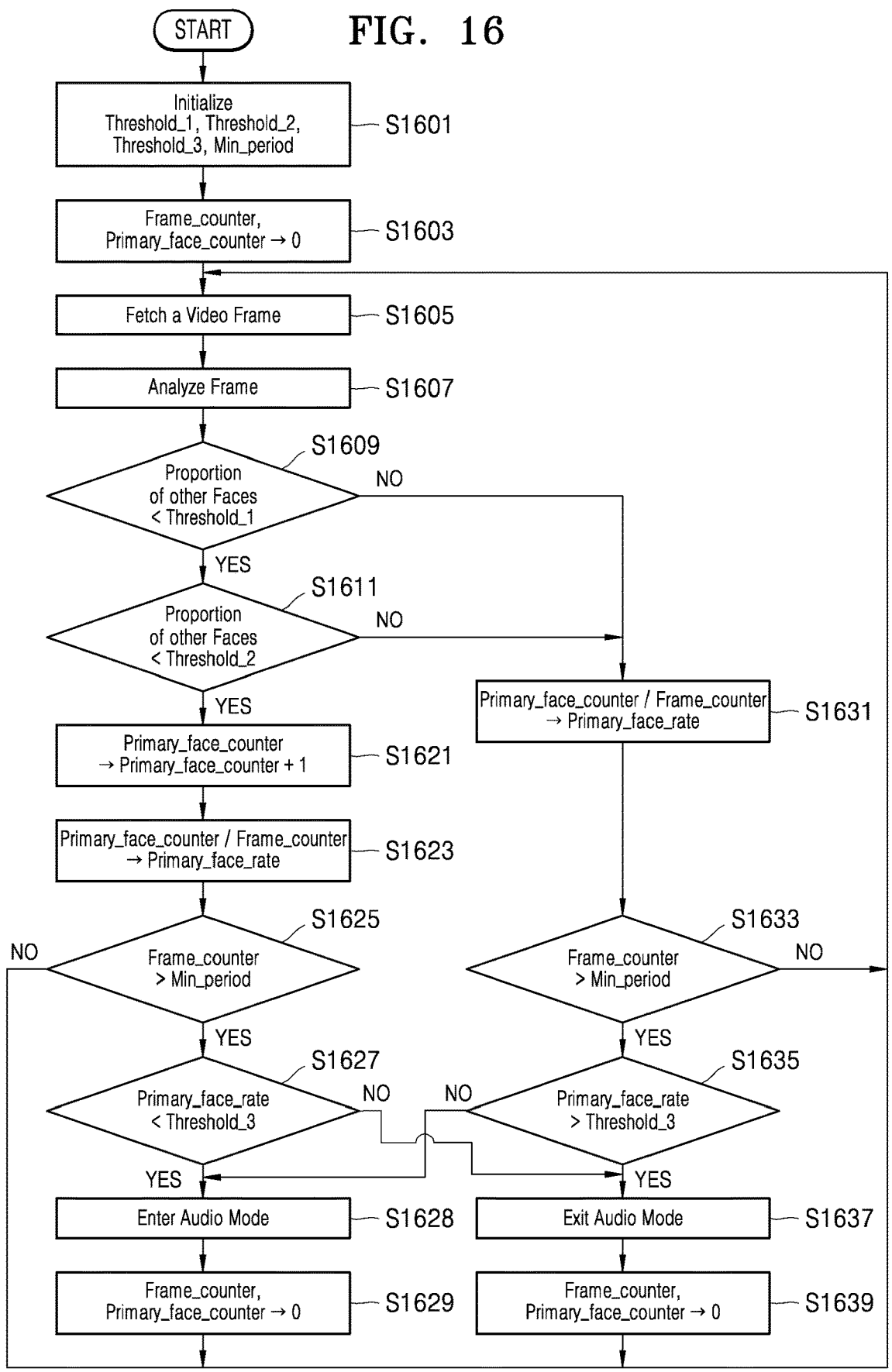
FIG. 16 is a flowchart of a method of selecting an operation mode based on an image signal input to a terminal device according to an embodiment.

FIG. 16 is a flowchart of a method of selecting an operation mode based on an image signal input to a terminal device according to an embodiment.

In operation S1601, the terminal device 500 may initialize Threshold_1, Threshold_2, Threshold_3 and Min_period that are variables used in an algorithm of selecting an operation mode.

In operation S1603, the terminal device 500 may initialize Frame_counter and Primary_face_counter as 0. Frame_counter indicates the number of a plurality of image frames included in a video transmission signal, and Primary_face_counter indicates the number of frames requesting the terminal device 500 to operate in an audio mode because content of an image is mainly related to a face of one person. Primary_face_rate indicates a rate of frames whose content is mainly related to a face of one person from among all frames.

In operation S1605, the terminal device 500 may obtain one frame included in the video transmission signal captured to be transmitted to an external device. Hereinafter, the frame obtained in operation S1605 is referred to as "the current frame". The terminal device 500 may increase a value of Frame_counter by 1.

In operation S1607, the terminal device 500 may analyze the current frame.

In operation S1609, the terminal device 500 may determine whether content of an image of the current frame is mainly related to a face of one person. The terminal device 500 may compare an area of a human face in all areas of an image with Threshold_1. The terminal device 500 may determine whether it is required for the terminal device 500 to operate in the speech mode because the content of the image is mainly related to the face of one person.

In a case where the area of the human face in all areas of the image is greater than Threshold_1, in operation S1611, the terminal device 500 may compare proportions of faces of other people included in a video with Threshold_2. When the proportions of faces of other people included in the video is less than Threshold_2, the terminal device 500 may count a frame being currently processed in operation S1621 as a primary face frame. The terminal device 500 may increase a value of Primary_face_counter by 1. The primary face frame may indicate a frame whose image content is mainly related to a face of one person.

In operation S1623, the terminal device 500 may calculate a proportion of the number of primary face frames (Primary_face_counter) among the number of all frames (Frame_counter), and may update Primary_face_rate to the calculated value.

In operation S1625, when the number of frames compressed in a current operation mode is greater than Min_period, the terminal device 500 may determine that a sufficiently long time for a switch of an operation mode has been elapsed. This is to prevent an audio compression quality from deteriorating due to a frequent switch of operation modes.

In operation S1627, the terminal device 500 may compare Primary_face_rate with Threshold_3.

In S1627, when Primary_face_rate is less than Threshold_3, in operation S1628, the terminal device 500 may select the audio mode and may enter the audio mode. When a current operation mode of the terminal device 500 is the audio mode, the terminal device 500 may continuously operate in the audio mode. When the current operation mode of the terminal device 500 is the speech mode, the terminal device 500 may switch an operation mode from the speech mode to the audio mode. In operation S1629, the terminal device 500 may initialize again Frame_counter and Primary_face_counter to 0, and may return to operation S1605. The terminal device 500 may reset Frame_counter and Primary_face_counter to 0 and thus may prevent a mode switch during Min_period.

In operation S1625, when the number of frames compressed in the current operation mode does not exceed Min_period, the terminal device 500 may return to operation S1605, may newly obtain a frame, and may repeat a frame processing procedure.

In operation S1627, when Primary_face_rate is equal to or greater than Threshold_3, in operation S1637, the terminal device 500 may select the speech mode. The terminal device 500 may exit the audio mode and may enter the speech mode. When the current operation mode of the terminal device 500 is the speech mode, the terminal device 500 may continuously operate in the speech mode. When the current operation mode of the terminal device 500 is the audio mode, the terminal device 500 may switch an operation mode from the audio mode to the speech mode.

In operation S1639, the terminal device 500 may initialize again Frame_counter and Primary_face_counter to 0, and may return to operation S1605.

In operation S1609, when the area of the human face in all areas of the image is equal to or less than Threshold_1, or when the proportions of faces of other people included in the video is equal to or greater than Threshold_2, the terminal device 500 may perform operation S1631. In this case, the terminal device 500 may determine that a frame being currently processed is a frame mainly including faces of a plurality of people. When the terminal device 500 determines that there is a high probability of receiving a speech signal of a plurality of people, the terminal device 500 may perform operation S1631.

In operation S1631, the terminal device 500 may calculate a proportion of the number of primary face frames (Primary_face_counter) among the number of all frames (Frame_counter), and may update Primary_face_rate to the calculated value.

In operation S1633, when the number of frames compressed in the current operation mode is greater than Min_period, in operation S1635, the terminal device 500 may compare Primary_face_rate with Threshold_3.

When Primary_face_rate is equal to or less than Threshold_3, in operation S1628, the terminal device 500 may select the audio mode. When Primary_face_rate is greater than Threshold_3, in operation S1637, the terminal device 500 may select the speech mode.

In operation S1633, when the number of frames compressed in the current operation mode does not exceed Min_period, the terminal device 500 may return to operation S1605, may newly obtain a frame, and may repeat a frame processing procedure.

As illustrated in FIG. 16, the terminal device 500 according to an embodiment may analyze video content of a speech call, and thus may automatically switch to an audio signal compression scheme that is most appropriate to a current situation. The terminal device 500 may compress an input audio signal by using a switched scheme and may transmit the compressed signal to an external device.

When the terminal device 500 according to an embodiment receives a non-speech audio signal or when it is required to transmit a non-speech audio signal, the terminal device 500 may switch a compression mode to the audio mode.

In order for the terminal device 500 to automatically switch an audio processing mode to the audio mode, the terminal device 500 may determine whether it is an emergency situation in which a user cannot talk, based on a result of analyzing an input audio signal.

Due to the increase in the nuclear family and single-person households, the number of people who live alone is increased. When an old person who lives alone is hurt from a fall, a child is missing, or a traffic accident or disasters occur, a device capable of providing location information of a corresponding person is requested.

Figure 17A:
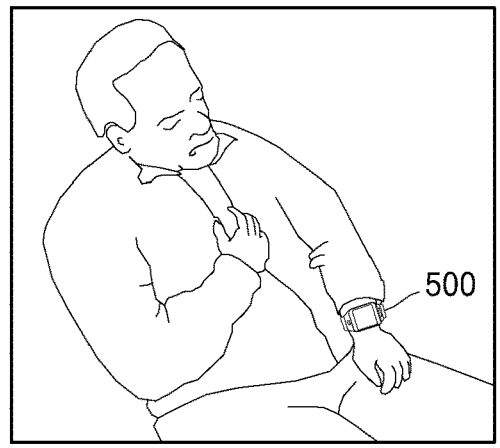
FIGS. 17A and 17B are diagrams for describing an emergency situation in which a call function of a terminal device is usable, according to an embodiment.
Figure 17B:
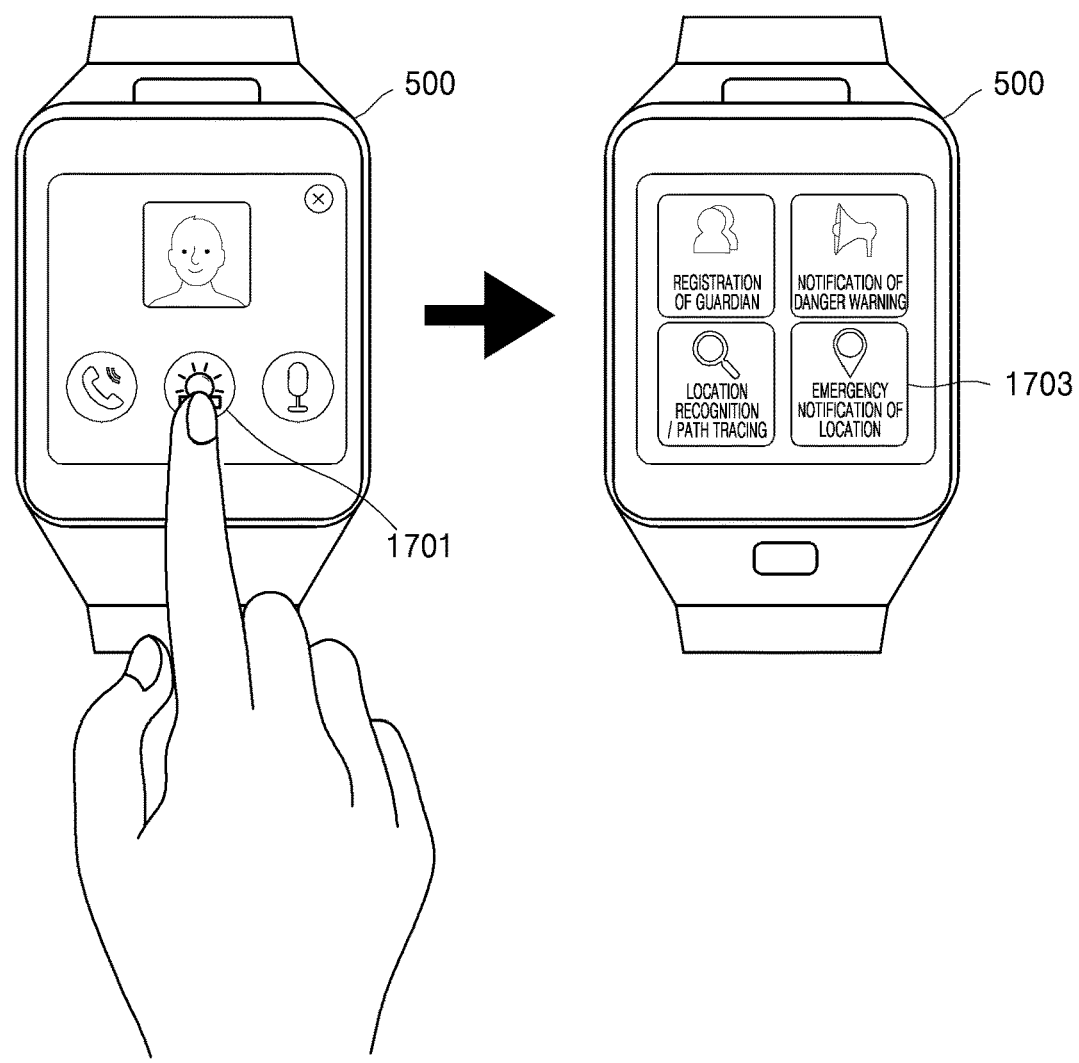

The terminal device 500 such as a smartphone or a wearable device shown in FIGS. 17A and 17B may include a function of transmitting current location information to a control center in an emergency situation. For example, as illustrated in FIG. 17A, when a user of the terminal device 500 falls, the terminal device 500 may transmit current location information to a control center and thus the user may be rapidly transported to a hospital.

As illustrated in FIG. 17B, the terminal device 500 may provide a user interface 501 for notifying an emergency situation to an external device or making an emergency call, and a user interface 503 for transmitting current location information to a control center.

The terminal device 500 may transmit location information calculated based on a GPS. However, when the terminal device 500 is located indoor or underground, it may be difficult to communicate with a GPS satellite capable of receiving location information. Thus, when the terminal device 500 is located indoor or underground, GPS-based location information transmitted by the terminal device 500 may be inaccurate. In this case, the control center may make an emergency call to the terminal device 500 according to an embodiment, and may estimate a current location of the terminal device 500, based on ambient sound or noise delivered from the terminal device 500.

However, in a case where a general terminal device supporting existing speech compression codecs transmits a non-speech audio signal, signal distortion may occur and thus it may be difficult to estimate a location of the terminal device, based on ambient sound or noise. The reason why the signal distortion occurs when the general terminal device transmits a non-speech audio signal has been described with reference to FIGS. 1 to 4, and thus overlapping descriptions are omitted.

Figure 18:
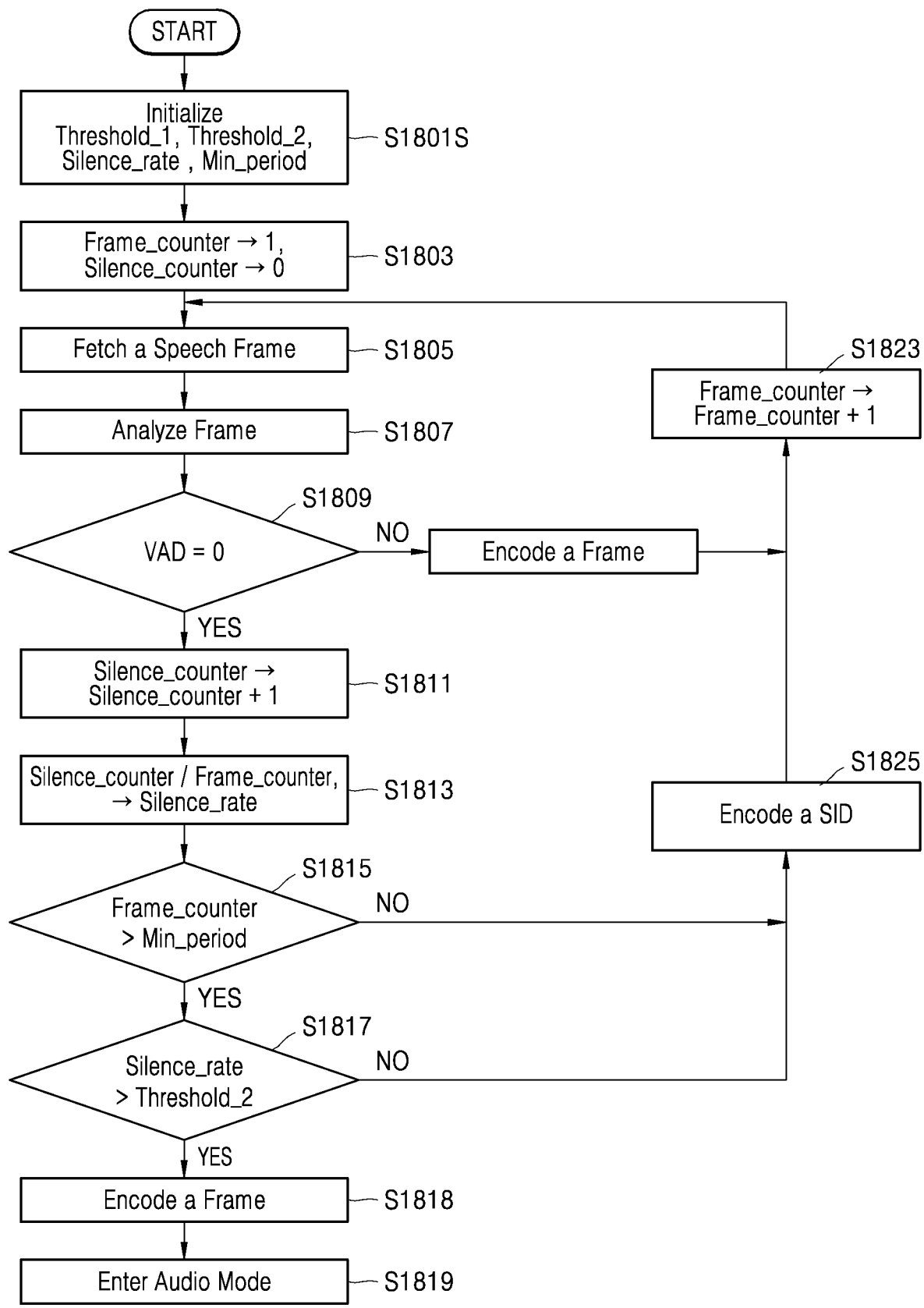
FIG. 18 is a flowchart of a method of selecting an operation mode based on an audio signal input to a terminal device according to an embodiment.

FIG. 18 is a flowchart of a method of selecting an operation mode based on an audio signal input to a terminal device according to an embodiment. FIG. 18 illustrates an algorithm, performed by the terminal device 500, of automatically switching a compression mode for an audio signal in an emergency situation.

FIG. 18 illustrates the algorithm, performed by the terminal device 500, of automatically switching the operation mode from a speech mode to an audio mode when it is determined as the emergency situation in which a user cannot talk. FIG. 16 illustrates the algorithm, performed by the terminal device 500, of automatically switching the operation mode according to a result of analysing the content of the image. The algorithm shown in FIG. 18 is different from the algorithm shown in FIG. 16 in that, when the speech mode is ended and then the audio mode is started, the audio mode is continuously maintained. According to the flowchart of FIG. 18, when the terminal device 500 enters the audio mode, the terminal device 500 does not automatically switch to the speech mode unless a separate input is received.

In operation S1801, the terminal device 500 may initialize Threshold_1, Threshold_2, Silence_rate, and Min_period that are variables used in an algorithm of selecting an operation mode. It is assumed that the terminal device 500 operates in a current speech mode.

In operation S1803, the terminal device 500 may initialize Frame_counter to 1, and may initialize Silence_rate to 0. Frame_counter indicates the number of a plurality of image frames included in a video transmission signal, and Silence_counter indicates the number of frames not including a speech signal. Silence_rate indicates a proportion of the frames not including a speech signal among all frames.

In operation S1805, the terminal device 500 may obtain one frame included in an audio transmission signal input to be transmitted to an external device. Hereinafter, the frame obtained in operation S1805 is referred to as "the current frame".

In operation S1807, the terminal device 500 may analyze the current frame.

In operation S1809, the terminal device 500 may determine whether the current frame includes a voice signal. For example, the terminal device 500 may determine whether the voice signal is included in each of input signal frames captured at 20-ms intervals.

In operation S1809, the terminal device 500 may determine whether the current frame includes the voice signal, based on a voice activity detection (VAD) operation by a codec.

When it is determined that, in operation S1809, the current frame includes the voice signal, VAD that is a parameter indicating whether the current frame includes the voice signal may be 1. When the current frame includes the voice signal (VAD=1), in operation S1821, the terminal device 500 may compress the current frame in the speech mode, may return to operation S1805, may newly obtain a frame, and then may repeat a frame processing procedure. In operation S1823, the terminal device 500 may increase a value of Frame_counter by 1.

In operation S1809, when it is determined that the current frame does not include the voice signal, VAD that is a parameter indicating whether the current frame includes the voice signal may be 0. When the current frame does not include the voice signal (VAD=0), in operation S1811, the terminal device 500 may increase Silence_counter by 1.

In operation S1813, the terminal device 500 may calculate Silence_rate. The terminal device 500 may calculate a proportion of the number of frames (Silence_counter) excluding a voice signal among the number of all frames (Frame_counter), and may update Silence_rate to the calculated value.

When the number of frames compressed in the voice mode is equal to or less than Min_period, in operation S1825, the terminal device 500 may encode SID. When a voice signal is not input for a time period that is short to be determined as an emergency situation, the terminal device 500 may determine that speaking is briefly discontinued and may output noise information. When the number of frames compressed in the speech mode is equal to or less than Min_period, the terminal device 500 may return to operation S1805, may newly obtain a frame, and may repeat a frame processing procedure. In operation S1823, the terminal device 500 may increase a value of Frame_counter by 1.

In operation S1815, when the number of frames compressed in the speech mode is greater than Min_period, the terminal device 500 may determine that a sufficiently long time for a switch of an operation mode has been elapsed.

In operation S1817, the terminal device 500 may compare Silence_rate with Threshold_2.

In operation S1817, when Silence_rate is greater than Threshold_2, the terminal device 500 may determine that it is an emergency situation in which a user cannot talk. In operation S1818, the terminal device 500 may encode the current frame, and in operation S1819, the terminal device 500 may select the audio mode and may enter the audio mode.

In operation S1817, when Silence_rate is equal to or less than Threshold_2, the terminal device 500 may output noise information, may return to operation S1805, may newly obtain a frame, and may repeat a frame processing procedure.

As illustrated in FIG. 18, when the terminal device 500 according to an embodiment analyzes an input audio signal and thus determines that it is an emergency situation in which a user cannot talk, the terminal device 500 may automatically switch to the audio mode. The terminal device 500 may automatically switch to the audio mode and thus may allow ambient sound of the terminal device 500 to be maximally delivered to a control center. The terminal device 500 may provide location information about the terminal device 500 by transmitting high-quality ambient audio to the control center.

Even when the terminal device 500 is switched to the audio mode and operates, in a case where it is the night time or the terminal device 500 is located in a secluded place, it may be difficult to recognize a location due to insufficient ambient sound. In this case, a vehicle or a rescue worker located near an accident scene may generate high-volume artificial ambient sound based on a bandwidth currently used by the terminal device 500. The terminal device 500 may receive, compress, and transmit a unique audio signal broadcast from the vehicle or the rescue worker located near the terminal device 500.

Figure 19:
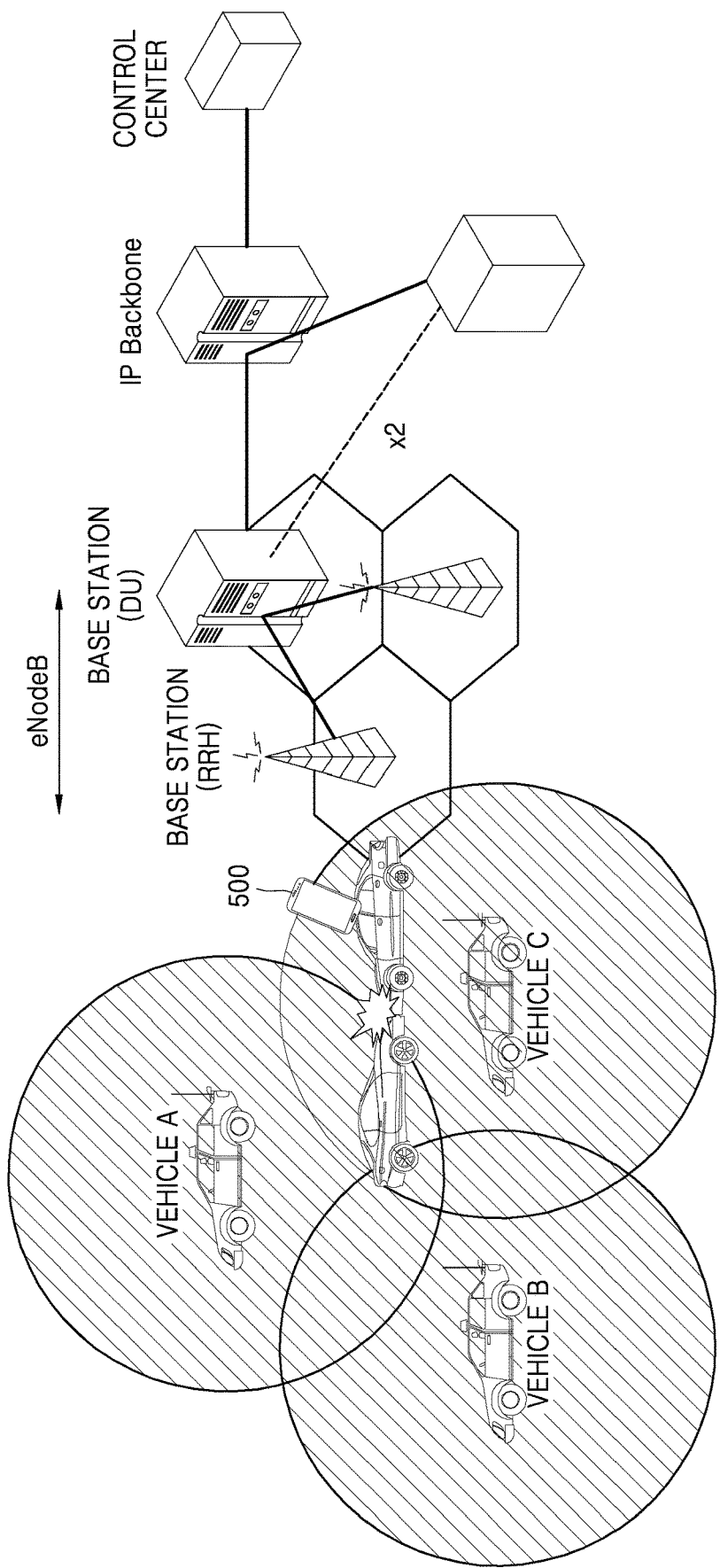
FIG. 19 is a diagram for describing a method of transmitting artificial ambient audio, the method being performed by a terminal device according to an embodiment.

As illustrated in FIG. 19, when a car accident occurred but a driver cannot exactly deliver a location of an accident due to severe injuries of the driver, the terminal device 500 may switch to the audio mode and may transmit high-quality ambient audio.

In this regard, a control center may control devices (e.g., a siren of a police car, or the like) to generate artificial ambient audio, the devices being located in an area presumed to be a location of an accident. The terminal device 500 may compress an audio signal generated by the devices located nearby and may transmit the audio signal to a base station connected to the control center.

The audio signal transmitted from the terminal device 500 may be used in tracing a location of the terminal device 500. The control center may reconstruct the audio signal that is compression of the artificial ambient audio and is transmitted by the terminal device 500, and may calculate a correlation between the artificial ambient audio and the reconstructed audio signal. The control center may re-dispose vehicles and rescue workers, according to a location of a device that broadcasts ambient audio having the highest similarity to the reconstructed audio signal, and may resume recognition of the location of the accident.

Some or all of the aforementioned embodiments can be written as computer programs and can be implemented in general-use digital computers that execute the programs by using a computer-readable medium. In addition, a data structure used in the embodiments can be written in a computer-readable medium through various means. The embodiments may be embodied as a recording medium, e.g., a program module to be executed in computers, which includes computer-readable instructions. For example, methods that are implemented as software modules or algorithms may be stored as computer readable codes or program commands executable on a computer-readable recording medium.

The computer-readable medium may include any recording medium that may be accessed by computers, volatile and non-volatile medium, and detachable and non-detachable medium. The computer-readable medium may include magnetic storage media (e.g., ROM, floppy disks, hard disks, etc.), optical recording media (e.g., CD-ROMs, or DVDs), etc, but is not limited thereto. Also, the computer-readable medium may include a computer storage medium and a communication medium.

A plurality of computer-readable recording media may be distributed over network coupled computer systems, and data stored in the distributed recording media, e.g., a program instruction and code, may be executed by using at least one computer.

Throughout the specification, the terms "unit", "module", or the like may indicate a hardware component such as a processor or a circuit, and/or may indicate a software component that is executed by a hardware configuration such as a processor.

For example, "unit" and "module" may be implemented by components, such as software components, object-oriented software components, class components and task components, processes, functions, attributes, procedures, subroutines, segments of program code, drivers, firmware, microcode, circuitry, data, databases, data structures, tables, arrays, and variables.

It is obvious to one of ordinary skill in the art that the descriptions of the disclosure may be easily embodied in many different forms without changing the technical concept or essential features of the disclosure. Thus, it should be understood that the embodiments described herein should be considered in a descriptive sense only and not for purposes of limitation. For example, configuring elements that are singular forms may be executed in a distributed fashion, and also, configuring elements that are distributed may be combined and then executed.

The scope of the present disclosure is defined not by the detailed description but by the appended claims, and all differences within the scope will be construed as being included in the present disclosure.

The invention claimed is:

1. A terminal device performing a call function with at least one external device via a network, the terminal device comprising:
   a receiver configured to receive at least one of an audio transmission signal and a video transmission signal to be transmitted to the external device;
   a processor configured to analyze at least one of the audio transmission signal and the video transmission signal, select one of a speech mode and an audio mode, based on a result of the analysis, and compress the audio transmission signal, based on the selected mode;
   a communicator configured to transmit the compressed audio transmission signal to the external device, and receive an audio reception signal from the external device; and
   an output unit configured to output the audio reception signal,
   wherein the processor is configured to detect a face of a human from each of a plurality of frames comprised in the video transmission signal, and select one of the speech mode and the audio mode, based on at least one of a number of the detected faces and an area of the detected face.

2. The terminal device of claim 1, wherein
the speech mode is a mode of using a compression scheme designed to compress a speech signal, and
the audio mode is a mode of using a compression scheme designed to compress a non-speech audio signal.

3. The terminal device of claim 1, wherein
the speech mode is a mode of using a compression scheme of changing at least one of a bit-rate and a bandwidth, according to the audio transmission signal, and
the audio mode is a mode of using a compression scheme of using at least one of a maximum bit-rate and a maximum bandwidth that are allowed in a call condition received via the network, regardless of the audio transmission signal.

4. The terminal device of claim 1, wherein
the terminal device uses an Enhanced Voice Services (EVS) codec to compress an audio signal,
the speech mode is a mode of compressing the audio transmission signal by using an algebraic code-excited linear prediction (ACELP) scheme, and
the audio mode is a mode of compressing the audio transmission signal by using a modified discrete cosine transform (MDCT) scheme.

5. The terminal device of claim 1, wherein
the speech mode is a mode of performing at least one of discontinuous transmission (DTX), linear predictive coding (LPC), and noise suppression (NS) in compressing the audio transmission signal, and
the audio mode is a mode of discontinuing the performing of at least one of DTX, LPC, and NS in compressing the audio transmission signal, and amplifying an output of a microphone receiving the audio transmission signal.

6. The terminal device of claim 1, wherein the processor is further configured to
select the speech mode, when the number of detected faces is 1 within a particular time and the area of the detected face is greater than a threshold area, and
select the audio mode, when the number of detected faces is equal to or greater than 2 within the particular time or the area of the detected face is equal to or less than the threshold area.

7. The terminal device of claim 1, wherein the processor is further configured to detect a human speech from each of a plurality of frames comprised in the audio transmission signal, and select one of the speech mode and the audio mode, based on a proportion of frames from which a human speech is not detected within a particular time among the plurality of frames.

8. The terminal device of claim 7, wherein the processor is further configured to
select the speech mode, when the proportion of frames from which a human speech is not detected within the particular time among the plurality of frames is equal to or less than a threshold proportion, and select the audio mode, when the proportion of frames from which a human speech is not detected within the particular time among the plurality of frames is greater than the threshold proportion.

9. The terminal device of claim 1, wherein
the processor is further configured to select the audio mode, and compress an audio transmission signal comprising an audio signal generated by a device located near the terminal device, and
the compressed audio transmission signal transmitted to the external device is used in tracing a location of the terminal device.

10. A method of performing, by a terminal device, a call function with at least one external device via a network, the method comprising:
receiving at least one of an audio transmission signal and a video transmission signal to be transmitted to the external device;
analyzing at least one of the audio transmission signal and the video transmission signal;
selecting one of a speech mode and an audio mode, based on a result of the analysis;
compressing the audio transmission signal, based on the selected mode; and
transmitting the compressed audio transmission signal to the external device,
wherein the selecting one of the speech mode and the audio mode comprises:
detecting a face of a human from each of a plurality of frames comprised in the video transmission signal;
selecting the speech mode, when a number of detected faces is 1 and an area of the detected face within a particular time is greater than a threshold area; and
selecting the audio mode, when the number of detected faces is equal to or greater than 2 or the area of the detected face within the particular time is equal to or less than the threshold area.

11. The method of claim 10, wherein
the speech mode is a mode of using a compression scheme of changing at least one of a bit-rate and a bandwidth, according to the audio transmission signal, and
the audio mode is a mode of using a compression scheme of using at least one of a maximum bit-rate and a maximum bandwidth that are allowed in a call condition received via the network, regardless of the audio transmission signal.

12. The method of claim 10, wherein
the speech mode is a mode of performing at least one of discontinuous transmission (DTX), linear predictive coding (LPC), and noise suppression (NS) in compressing the audio transmission signal, and
the audio mode is a mode of discontinuing the performing of at least one of DTX, LPC, and NS in compressing the audio transmission signal, and amplifying an output of a microphone receiving the audio transmission signal.

13. The method of claim 10, wherein the selecting one of the speech mode and the audio mode further comprises:
detecting a human speech from each of a plurality of frames comprised in the audio transmission signal; and
selecting one of the speech mode and the audio mode, based on a proportion of frames from which a human speech is not detected within a particular time among the plurality of frames.

14. The method of claim 13, wherein the selecting of one of the speech mode and the audio mode, based on the proportion of the frames from which a human speech is not detected comprises:
selecting the speech mode, when the proportion of frames from which a human speech is not detected within the particular time among the plurality of frames is equal to or less than a threshold proportion; and
selecting the audio mode, when the proportion of frames from which the human speech is not detected within the particular time among the plurality of frames is greater than the threshold proportion.

15. The method of claim 10, wherein
the compressing comprises compressing, based on the audio mode, an audio transmission signal comprising an audio signal generated by a device located near the terminal device, and
the compressed audio transmission signal transmitted to the external device is used in tracing a location of the terminal device.

16. A non-transitory computer-readable recording medium having recorded thereon at least one program comprising instructions, when executed on a computing device, cause a terminal device to perform a method of performing a call function with at least one external device via a network, the method comprising:
receiving at least one of an audio transmission signal and a video transmission signal to be transmitted to the external device;
analyzing at least one of the audio transmission signal and the video transmission signal;
selecting one of a speech mode and an audio mode, based on a result of the analysis;
compressing the audio transmission signal, based on the selected mode; and
transmitting the compressed audio transmission signal to the external device,
wherein the selecting one of the speech mode and the audio mode comprises:
detecting a face of a human from each of a plurality of frames comprised in the video transmission signal;
selecting the speech mode, when a number of detected faces is 1 and an area of the detected face within a particular time is greater than a threshold area; and
selecting the audio mode, when the number of detected faces is equal to or greater than 2 or the area of the detected face within the particular time is equal to or less than the threshold area.

* * * * *